(12) United States Patent
Hayashi et al.

(10) Patent No.: US 8,130,055 B2
(45) Date of Patent: Mar. 6, 2012

(54) HIGH-FREQUENCY DEVICE AND HIGH-FREQUENCY CIRCUIT USED THEREIN

(75) Inventors: Kenji Hayashi, Kumagaya (JP); Masayuki Uchida, Yazu-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 285 days.

(21) Appl. No.: 12/376,678

(22) PCT Filed: Aug. 9, 2007

(86) PCT No.: PCT/JP2007/065661
§ 371 (c)(1), (2), (4) Date: Feb. 6, 2009

(87) PCT Pub. No.: WO2008/018565
PCT Pub. Date: Feb. 14, 2008

(65) Prior Publication Data
US 2010/0182097 A1    Jul. 22, 2010

(30) Foreign Application Priority Data

Aug. 9, 2006  (JP) ................................. 2006-216448
Nov. 20, 2006 (JP) ................................. 2006-312771
Feb. 15, 2007 (JP) ................................. 2007-034435
Mar. 30, 2007 (JP) ................................. 2007-091192

(51) Int. Cl.
*H03H 7/38* (2006.01)
(52) U.S. Cl. ......................................... 333/32
(58) Field of Classification Search .................... 333/32, 333/33
See application file for complete search history.

(56) References Cited

U.S. PATENT DOCUMENTS

| 6,633,206 B1 | 10/2003 | Kato |
| 2003/0011443 A1 | 1/2003 | Liu et al. |
| 2004/0201094 A1 | 10/2004 | Sato et al. |

FOREIGN PATENT DOCUMENTS

| EP | 1 187 357 A1 | 3/2002 |
| EP | 1187357 A1 | 3/2002 |
| JP | 2000-223901 A | 8/2000 |
| JP | 2002-171196 A | 6/2002 |
| JP | 2002-300081 A | 10/2002 |

(Continued)

OTHER PUBLICATIONS

Supplementary European Search Report with European Search Opinion dated Nov. 2, 2009 in corresponding European Patent Application No. 07 792 308.4.

(Continued)

*Primary Examiner* — Stephen Jones
(74) *Attorney, Agent, or Firm* — Sughrue Mion, PLLC

(57) ABSTRACT

A high-frequency device having a high-frequency circuit comprising a high-frequency amplifier, and an output-matching circuit receiving high-frequency power output from the high-frequency amplifier, in and on a multilayer substrate obtained by laminating pluralities of dielectric layers, the output-matching circuit comprising a first transmission line transmitting the high-frequency power from the high-frequency amplifier side to the output terminal side, and at least part of the first transmission line being formed by series-connecting pluralities of conductor patterns formed on pluralities of dielectric layers in a laminate direction.

10 Claims, 17 Drawing Sheets

FOREIGN PATENT DOCUMENTS

| | | |
|---|---|---|
| JP | 2003-324326 A | 11/2003 |
| JP | 2004-007585 A | 1/2004 |
| JP | 2004-147166 A | 5/2004 |
| JP | 2004-241875 A | 8/2004 |
| JP | 2005-094795 A | 4/2005 |
| JP | 2005-277515 A | 10/2005 |
| JP | 2006-157093 A | 6/2006 |
| JP | 2006-157095 A | 6/2006 |
| WO | 00/72457 A1 | 11/2000 |
| WO | 03/021775 A1 | 3/2003 |

OTHER PUBLICATIONS

Office Action dated Jun. 9, 2011 in corresponding European Patent Application No. 07 792 308.

Lower Frequency Side

Higher Frequency Side

HIGH-FREQUENCY DEVICE AND HIGH-FREQUENCY CIRCUIT USED THEREIN

CROSS REFERENCE TO RELATED APPLICATIONS

This application is a National Stage of International Application No. PCT/JP2007/65661 filed Aug. 9, 2007, claiming priority based on Japanese Patent Application Nos. 2006-216448 filed Aug. 9, 2006, 2006-312771 filed Nov. 20, 2006, 2007-034435 filed Feb. 15, 2007 and 2007-091192 filed Mar. 30, 2007, the contents of all of which are incorporated herein by reference in their entirety.

FIELD OF THE INVENTION

The present invention relates to a high-frequency device comprising a high-frequency amplifier used together with an antenna switch module in a wireless communications system for transmitting and receiving signals in different frequencies, and a high-frequency circuit constituting such device.

BACKGROUND OF THE INVENTION

There are various mobile communications systems, for instance, EGSM (extended global system for mobile communications) and DCS (digital cellular system) widely used mostly in Europe, PCS (personal communications service) widely used in the U.S., and PDC (personal digital cellular system) used in Japan. Small, lightweight, high-frequency circuit devices adapted to pluralities of systems include, for instance, dual-band, high-frequency switch modules adapted to two systems of EGSM and DCS, triple-band, high-frequency switch modules adapted to three systems of EGSM, DCS and PCS, etc. Wireless LAN data communications according to the IEEE802.11 standard, etc. are also widely used at present. The wireless LAN standard includes pluralities of standards having different frequency bands, etc., and various high-frequency circuits are used in wireless-LAN, multiband communications apparatuses.

To output signals having relatively large power, a transmission system of a cell phone comprises a high-power amplifier (high-frequency amplifier) of several W. To provide small cell phones, etc. with low power consumption, a high-power amplifier consuming most of DC power is required to have high DC-RF power-converting efficiency, which may also be called power-adding efficiency, and a small size. In a high-frequency device comprising an antenna switch module and a high-power amplifier in combination, which is used in mobile communications apparatuses such as cell phones, etc., its high-frequency circuit is provided with an output-matching circuit for impedance matching. Accordingly, for the purpose of miniaturization, not only the high-power amplifier but also the antenna switch module, the output-matching circuit, etc. should be miniaturized.

The output-matching circuit is constituted by a transmission line, and pluralities of capacitors connected to the transmission line. In the output-matching circuit of JP 2004-147166 A, a linear transmission line is formed on a surface layer of a laminate, such that impedance matching can be finely adjusted after integrating a high-frequency amplifier module with a high-frequency switch module. Because the transmission line should be sufficiently long to secure sufficient impedance, the output-matching circuit of JP 2004-147166 A is not suitable for miniaturization. In addition, a long transmission line has large conduction loss, hindering higher performance.

Harmonics contained in high-frequency power output from the high-frequency amplifier and passing through the output-matching circuit should be removed by a filter circuit, etc. However, the filter circuit does not necessarily attenuate harmonics fully, and larger attenuation makes the filter circuit more complicated and larger. It is thus difficult to achieve both the suppression of harmonics and the miniaturization of the high-frequency circuit.

In cell phone systems, to avoid the mixing of signals with nearby cell phones to keep communications quality stably, control signals (power control signals) are sent from base stations to cell phones such that transmitting outputs have the minimum power necessary for communications. An automatic power control (APC) circuit operated based on control signals acts to control the gate voltage of a high-frequency amplifier to provide a transmitting output with necessary power for communications. This control is conducted by comparing signals detecting power output from the high-frequency amplifier with the power control signals sent from the base station. The output of the high-frequency amplifier is detected, for instance, by a coupler connected to its output terminal. However, a conventional coupler mounted onto a printed circuit board discretely from an output-matching circuit, etc. occupies a large mounting area, preventing the miniaturization of mobile communications apparatuses.

JP 2003-324326 A proposes a high-frequency amplifying apparatus comprising a high-frequency amplifier, an output-matching circuit and a coupler integrally formed on a substrate. However, the formation of the output-matching circuit and the coupler on one substrate still fails to fully miniaturize the high-frequency device. In general, a main line and a sub-line in the coupler are as long as about ¼ of the wavelength of a frequency used. Because the ¼ wavelength of a band mainly used in cell phones, etc. is about 15-100 mm, the plane structure described in JP 2003-324326 A fails to materialize as small high-frequency devices as 10 mm or less on each side. Also, because there is a likelihood of short-circuiting when a main line and a sub-line in the coupler are made closer to each other on a substrate for miniaturization, the reduction of a gap between the main line and the sub-line is limited.

OBJECTS OF THE INVENTION

Accordingly, an object of the present invention is to provide a small, high-performance, high-frequency device comprising an output-matching circuit.

Another object of the present invention is to provide a high-frequency circuit constituting such a high-frequency device.

DISCLOSURE OF THE INVENTION

The first high-frequency device of the present invention has a high-frequency circuit comprising a high-frequency amplifier, and an output-matching circuit receiving high-frequency power output from the high-frequency amplifier, in and on a multilayer substrate obtained by laminating pluralities of dielectric layers, the output-matching circuit comprising a first transmission line transmitting the high-frequency power from the high-frequency amplifier side to the output terminal side, and at least part of the first transmission line being formed by series-connecting pluralities of conductor patterns formed on pluralities of dielectric layers in a laminate direction. This structure can make a conductor pattern on each dielectric layer smaller, thereby miniaturizing the high-frequency device.

Pluralities of the conductor patterns are preferably connected spirally with a lamination direction as a center axis. This makes it possible to obtain high impedance even in a limited space, further miniaturizing the high-frequency device.

It is preferable that pluralities of the conductor patterns are connected through via-electrodes, and that among pluralities of the conductor patterns, those formed on adjacent dielectric layers are opposing in a lamination direction only in portions connected through a via-electrode. With this structure, the conductor patterns formed on adjacent dielectric layers have a reduced degree of coupling, so that the desired impedance can be obtained even from a short transmission line, resulting in the miniaturization and loss reduction of the high-frequency device.

In one embodiment of the present invention, a portion of the first transmission line, which is constituted by pluralities of conductor patterns formed on pluralities of dielectric layers, has a first end on the high-frequency amplifier side and a second end on the output terminal side, the first end being connected to the high-frequency amplifier through a via-electrode, and the second end being located at a lamination direction position closer to the high-frequency amplifier than the first end.

In another embodiment of the present invention, a portion of the first transmission line, which is constituted by pluralities of conductor patterns formed on pluralities of dielectric layers, has a first end on the high-frequency amplifier side and a second end on the output terminal side, the first end being connected to the high-frequency amplifier through a via-electrode, and the second end being located at a lamination direction position more distant from the high-frequency amplifier than the first end.

A ground electrode is preferably disposed at a lamination direction position closer to the first end than the second end of the first transmission line. This structure enables the first transmission line to have impedance increasing from the first end to the second end, suitable for matching with increase from low impedance to high impedance. Because pluralities of conductor patterns are connected through via-electrodes, the characteristic impedance of the first transmission line changes stepwise from the first end to the second end. The change of the characteristic impedance can also be obtained by making the first transmission line wider toward the input side.

Because part of impedance matching is achieved by the change of the characteristic impedance of the first transmission line, the first transmission line can be made shorter to miniaturize the high-frequency circuit comprising an output-matching circuit. The reduction of the length of the first transmission line contributes to loss reduction. The characteristic impedance of the first transmission line does not include the impedance of other circuit elements branch-connected to the first transmission line.

In one embodiment of the present invention, in at least part of adjacent dielectric layers, a conductor pattern formed on a dielectric layer closer to the ground electrode is preferably wider than a conductor pattern formed on a dielectric layer more distant from the ground electrode. With this structure, the first transmission line has impedance larger at the second end than at the first end, facilitating impedance matching.

In another embodiment of the present invention, a ground electrode is disposed at a lamination direction position closer to the second end than the first end of the first transmission line. With this structure, the first transmission line has impedance smaller at the second end than at the first end, suitable for matching with decrease from high impedance to low impedance. The same effect can be obtained by making the first transmission line wider toward the output side. When a conductor pattern closer to the ground electrode is wider than a conductor pattern more distant from the ground electrode, the first transmission line has impedance larger on the first end side than on the second end side.

The second high-frequency device of the present invention has a high-frequency circuit comprising a high-frequency amplifier, and an output-matching circuit receiving high-frequency power output from the high-frequency amplifier, in and on a multilayer substrate obtained by laminating pluralities of dielectric layers, the output-matching circuit comprising a first transmission line transmitting the high-frequency power from the high-frequency amplifier side to the output terminal side, and a coupler comprising a main line and a sub-line for detecting the high-frequency power, the main line being at least part of the first transmission line, and the main line and the sub-line being formed in the multilayer substrate. This structure can miniaturize the high-frequency device with a coupler.

In one embodiment of the present invention, at least part of an electrode pattern constituting the main line and at least part of an electrode pattern constituting the sub-line are opposing each other on the dielectric layer. In another embodiment of the present invention, at least part of an electrode pattern constituting the main line and at least part of an electrode pattern constituting the sub-line are opposing each other via the dielectric layer in a lamination direction.

It is preferable that at least part of the electrode pattern constituting the sub-line is narrower than at least part of the electrode pattern constituting the main line, and that when viewed from above, at least part of the electrode pattern constituting the sub-line is located inside at least part of the electrode pattern constituting the main line. This structure can suppress the variation of the coupling of the main line and the sub-line due to the positional deviation of electrode patterns.

One end of the sub-line is preferably terminated with a resistor and a capacitor parallel-connected to the resistor. A transmission line is preferably connected in series to the capacitor. This structure can reduce the necessary length of the main line and the sub-line, suitable for miniaturization.

The third high-frequency device of the present invention has a high-frequency circuit comprising a high-frequency amplifier, and an output-matching circuit receiving high-frequency power output from the high-frequency amplifier, in and on a multilayer substrate obtained by laminating pluralities of dielectric layers, the output-matching circuit comprising a first transmission line transmitting the high-frequency power from the high-frequency amplifier side to the output terminal side, and at least one resonance circuit branch-connected to the first transmission line, and at least part of the first transmission line being constituted by conductor patterns formed on dielectric layers in the multilayer substrate. The connection of the resonance circuit provides the output-matching circuit with a function of attenuating a frequency band corresponding to the resonance frequency. Namely, the resonance circuit can adjust attenuation pole. Because the first transmission line in the output-matching circuit need not be large for the formation of an attenuation pole, the high-frequency device can be miniaturized.

In one example of the output-matching circuit, the resonance circuit is a series resonance circuit constituted by a first capacitor branch-connected to the first transmission line and a second transmission line. This series resonance circuit branching from the first transmission line has a function of attenuating a frequency band corresponding to its resonance frequency. This structure can reduce the length of the first transmission line constituting the main line of the output-matching circuit, contributing to the miniaturization of the high-frequency device.

In another example of the output-matching circuit, there is a parallel resonance circuit constituted by a third transmission line series-connected to the first transmission line and a second capacitor parallel-connected to the third transmission line. This parallel resonance circuit attenuates a frequency band corresponding to its resonance frequency.

A further example of the output-matching circuit comprises, in addition to the third transmission line and the second capacitor, a fourth transmission line and a third capacitor, one end of the fourth transmission line being connected to an output-terminal-side end of the third transmission line, the other end of the fourth transmission line being connected to an output-terminal-side end of the second capacitor, one end of the third capacitor being connected to the other end of the fourth transmission line, and the other end of the third capacitor being grounded. This structure provides large attenuation.

The resonance frequency of the above resonance circuit is preferably adjusted such that it is substantially the same as a frequency of at least one of the n-th harmonics of the high-frequency power, wherein n is a natural number of 2 or more. When the attenuation pole of the resonance circuit is substantially equal to the frequencies of the n-th harmonics of the high-frequency power, the unnecessary band of the high-frequency power output from the output-matching circuit is attenuated.

The high-frequency device in any one of the first to third embodiments preferably comprises an antenna switch module comprising a switch circuit for switching the connection of a transmission system and a receiving system, there being impedance matching between the output-matching circuit and the antenna switch module.

The high-frequency circuit of the present invention comprises a high-frequency amplifier, and an output-matching circuit receiving high-frequency power output from the high-frequency amplifier, the output-matching circuit comprising a first transmission line transmitting the high-frequency power from the high-frequency amplifier side to the output terminal side, at least part of the first transmission line having characteristic impedance changing from the high-frequency amplifier side to the output terminal side.

DESCRIPTION OF THE BEST MODE OF THE INVENTION

Figure 1:
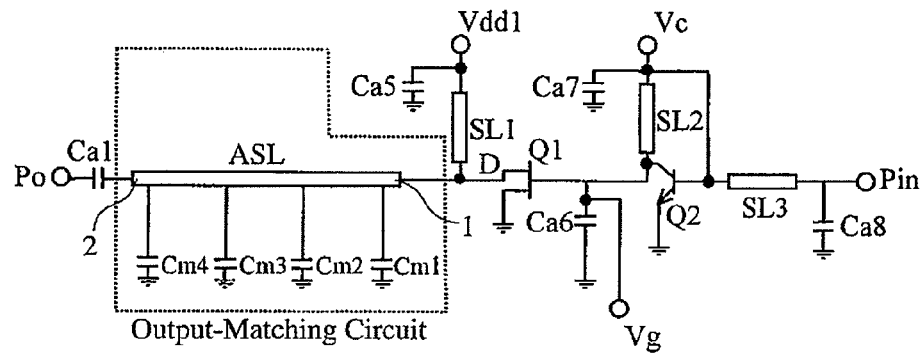
FIG. 1 is a view showing one example of the equivalent circuits of the high-frequency circuit according to the first embodiment of the present invention.

Taking a cell phone comprising an antenna switch module for example, the high-frequency device of the present invention will be explained in detail below referring to the drawings, without intention of restricting the scope of the present invention. Because the structures explained separately in each embodiment are applicable to other embodiments unless otherwise mentioned, those having requirements in these embodiments in combination are also within the scope of the present invention.

[1] First Embodiment

In the first embodiment, at least part of a main transmission line (first transmission line) in the output-matching circuit has a structure in which pluralities of conductor patterns formed on dielectric layers constituting the multilayer substrate are laminated. FIG. 1 shows the equivalent circuit of the high-frequency circuit according to the first embodiment of the present invention. This high-frequency circuit comprises a semiconductor device Q1, and an output-matching circuit (encircled by a dotted line) receiving high-frequency power amplified by the semiconductor device Q1. An output terminal Po of the output-matching circuit is connected, for instance, to a transmission terminal Tx-LB for EGSM Tx in the antenna switch module shown in FIG. 9, so that the amplified transmitting signals are sent to an antenna switch. The first transmission line ASL of the output-matching circuit is connected in series between the semiconductor device Q1 and the output terminal Po, so that high-frequency power is transmitted to the output terminal Po. There is a DC-cutting capacitor Ca1 between an end of the first transmission line ASL and the output terminal Po.

(A) Output-Matching Circuit

In the output-matching circuit shown in FIG. 1, pluralities of capacitors Cm1, Cm2, Cm3, Cm4 each having one end grounded are branch-connected to the first transmission line ASL. The capacitors Cm1, Cm2, Cm3, Cm4 adjust the impedance of the output-matching circuit. The number of capacitors may be changed, if necessary.

The high-frequency device in this embodiment has a high-frequency circuit comprising the output-matching circuit, in and on a multilayer substrate obtained by laminating pluralities of electrode-formed dielectric layers. Although the dielectric layers may be made of semiconductors, ceramics or resins, the ceramics are preferable for the easiness of miniaturization and cost reduction. When the multilayer substrate is constituted by semiconductor substrates, at least part of amplifying elements, the output-matching circuit, etc. may be integral with the semiconductor substrates.

The semiconductor devices are disposed on and/or in the multilayer substrate. When the semiconductor devices are mounted on the multilayer substrate surface, the multilayer substrate surface may be flat or recessed. Also, part of the transmission lines and the capacitors constituting the output-matching circuit, etc. may be formed in the multilayer substrate, the remainder being mounted on the multilayer substrate as chip parts, etc.

Figure 2A:
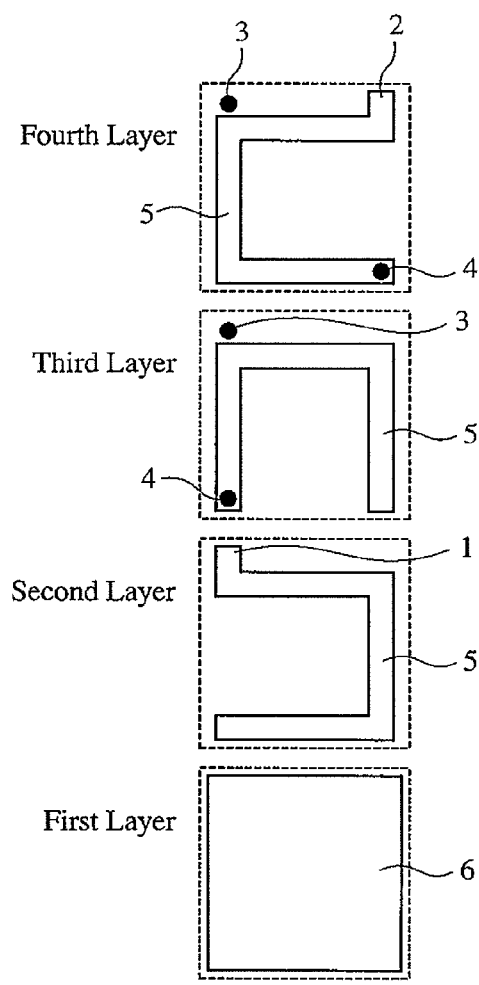
FIG. 2(a) is a development view showing dielectric layers on which conductor patterns for a first transmission line in an output-matching circuit are formed, as part of one example of the high-frequency devices according to the first embodiment of the present invention.
Figure 2B:
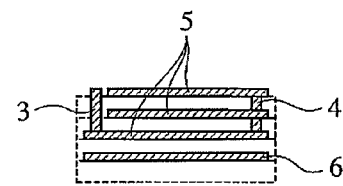
FIG. 2(b) is a view showing the lamination structure of the first transmission line of FIG. 2(a).

FIG. 2 shows an example in which at least part of the first transmission line is spirally formed with a lamination direction as a center axis. FIG. 2(a) shows conductor patterns formed on dielectric layers to constitute the first transmission line, and FIG. 2(b) shows the lamination structure of the conductor patterns [viewed from the left in FIG. 2(a)]. In FIG. 2(b), via-electrodes, etc. connected to layers above the fourth layer are omitted. The first to fourth layers are only dielectric layers having conductor patterns, whose number is not necessarily equal to the number of dielectric layers in the entire high-frequency device.

Pluralities of C-shaped conductor patterns 5, 5, 5 constituting the first transmission line ASL are arranged on the second to fourth layers with overlap in a lamination direction, and connected in series through via-electrodes 4 to form a spiral with a lamination direction as a center axis. Spiral connection provides the first transmission line ASL with high impedance even in a limited space. The shape, number, connection manner, etc., of conductor patterns are not limited to those depicted. For instance, the conductor patterns are not limited to be C-shaped, but may be straight, L-shaped or arcuate. Further, the connection of conductor patterns through via-electrodes is not limited to a spiral.

In FIG. 2(a), a semiconductor device for the high-frequency amplifier is disposed on the fourth layer or a layer thereabove, and a terminal of the semiconductor device is connected through a via-electrode 3 to a first end 1 (an semiconductor-device-side end in the equivalent circuit shown in FIG. 1) of a conductor pattern 5 formed on the second layer.

An electrode pattern for a transmission line may be further disposed between the semiconductor device and the via-electrode 3. Although the semiconductor device is preferably mounted on the multilayer substrate surface for the easiness of mounting, it may be disposed in the multilayer substrate. In the example shown in FIG. 2, a second end 2 (an end on the side of the output terminal Po in the equivalent circuit shown in FIG. 1) of the first transmission line constituted by pluralities of conductor patterns is closer to the semiconductor device than the first end 1 of the conductor pattern 5. This structure is suitable for the connection of the output-matching circuit and its downstream circuits near the semiconductor device.

In the example shown in FIG. 2, a ground electrode 6 is formed on the first layer located at the closest lamination position to the first end 1 of the first transmission line, such that it overlaps pluralities of conductor patterns in a lamination direction, and no ground electrode is formed on a layer (not shown) above the fourth layer. Because the first end 1 of the first transmission line is closest to the ground electrode 6, and because the second end 2 is most distant from the ground electrode 6, the first transmission line easily has higher impedance on the side of the second end 2, suitable for matching with impedance increasing from the first end 1 to the second end 2. Such effect can be obtained even when there is a ground electrode on a layer above the fourth layer, as long as the distance between the first end 1 of the first transmission line and the ground electrode 6 is smaller than the distance between the second end 2 and the ground electrode on an upper layer.

When the first transmission line ASL is formed by series-connecting pluralities of conductor patterns formed over pluralities of dielectric layers as described above, a gap between the first transmission line ASL and the ground 6 increases stepwise from the first end 1 to the second end 2, so that the characteristic impedance of the first transmission line ASL also increases stepwise. How the characteristic impedance of the first transmission line ASL changes is not restricted, but may be either continuous or stepwise. However, the stepwise change of the characteristic impedance provides the output-matching circuit with a simple structure as shown in FIG. 2. In the case of FIG. 2, a conductor pattern formed on each dielectric layer has substantially constant characteristic impedance, and the characteristic impedance changes where conductor patterns formed on adjacent dielectric layers are connected through a via-electrode.

Because a semiconductor device generally has as low impedance as several Ω on the output side, its impedance should be increased to achieve matching with 50Ω in a downstream circuit such as an antenna switch module, etc. Accordingly, it is preferable that the characteristic impedance of the first transmission line ASL increases from the first end 1 on the semiconductor device side to the second end 2 on the side of the output terminal Po. Using such first transmission line ASL in the output-matching circuit shown in FIG. 1, the first transmission line ASL can be made shorter than when the impedance is changed only by branch-connecting pluralities of capacitors Cm1, Cm2, Cm3, Cm4 to a first transmission line ASL having constant characteristic impedance. As a result, miniaturization and loss reduction are achieved for the output-matching circuit and a high-frequency circuit comprising it.

Figure 3A:
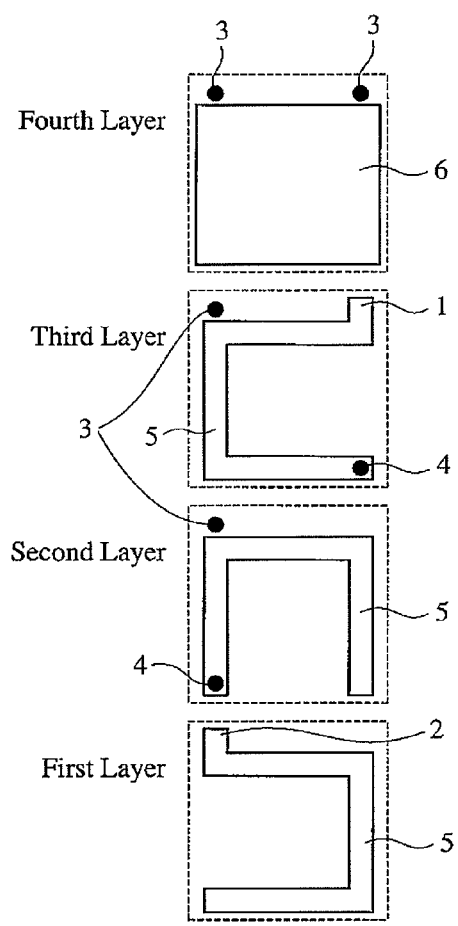
FIG. 3(a) is a development view showing dielectric layers on which conductor patterns for a first transmission line in an output-matching circuit are formed, as part of another example of the high-frequency devices according to the first embodiment of the present invention.
Figure 3B:
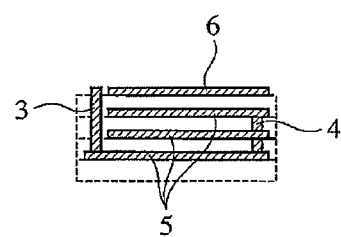
FIG. 3(b) is a view showing the lamination structure of the first transmission line of FIG. 3(a).

The stepwise increase of characteristic impedance from the first end 1 to the second end 2 can also be achieved by the structure shown in FIG. 3. FIG. 3 shows another example of a first transmission line constituted by pluralities of conductor patterns series-connected to form a spiral with a lamination direction as a center axis. FIG. 3(*a*) shows conductor patterns on first to fourth layers, and FIG. 3(*b*) shows the lamination structure of conductor patterns on the first to fourth layers [viewed from the left in FIG. 3(*a*)]. In FIG. 3(*b*), via-electrodes connected to layers above the fourth layer are omitted. Pluralities of conductor patterns 5 formed on the first to third layers are connected in series through via-electrodes 4, to form a first transmission line with an opposite spiral direction to that shown in FIG. 2. In the example shown in FIG. 3, the second end 2 of the first transmission line is more distant from the semiconductor device than the first end 1.

A semiconductor device in the high-frequency amplifier is disposed on a layer above the fourth layer, and connected to the first end 1 of a conductor pattern 5 formed on the third layer through a via-electrode 3. A C-shaped conductor pattern 5 formed on the third layer is connected in series to a C-shaped conductor pattern 5 formed on the second layer through a via-electrode 4, which is then connected in series to a C-shaped conductor pattern 5 formed on the first layer through a via-electrode, thereby forming a first transmission line in the form of a spiral with a lamination direction as a center axis. In the example shown in FIG. 3, the first end 1 of the first transmission line on the third layer is close to the semiconductor device, the first transmission line is spiral from the third layer to the first layer, and the second end 2 of the first transmission line on the first layer is most distant from the semiconductor device. Although the second end 2 of the first transmission line may be connected to a conductor pattern for the transmission line formed on a layer above the fourth layer (for instance, a layer having the semiconductor device) through a via-electrode 3 as shown in FIG. 3, it may be connected to a downstream circuit on a dielectric layer such as the first layer (within the multilayer substrate). In this case, a circuit downstream of the output-matching circuit can be connected at a position distant from the semiconductor device in a lamination direction.

FIG. 3 shows a further example of forming at least part of a first transmission line spirally with a lamination direction as a center axis. In this example, a ground electrode 6 is formed on a fourth layer such that it overlaps pluralities of conductor patterns for the first transmission line in a lamination direction. Because there is no ground electrode on a layer below the first layer, for instance, a layer (not shown) adjacent to the first layer, the first end 1 of the first transmission line is closest to the ground electrode, and the second end 2 is most distant from the ground electrode. Accordingly, like in the structure shown in FIG. 2, the characteristic impedance of the first transmission line increases stepwise from the first end 1 on the semiconductor device side to the second end 2 on the side of the output terminal Po, thereby easily achieving impedance matching. Even when there is a ground electrode on a layer below the first layer, the above effect can be obtained if the distance between the first end 1 of the first transmission line and the ground electrode 6 is smaller than the distance between the second end 2 and a ground electrode on a lower layer.

Figure 4A:
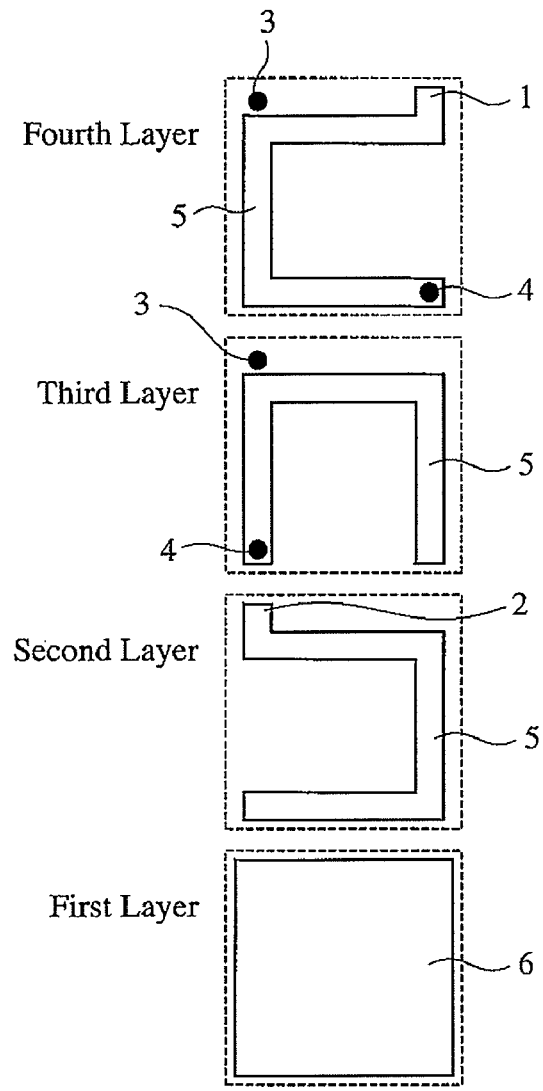
FIG. 4(a) is a development view showing dielectric layers on which conductor patterns for a first transmission line in an output-matching circuit are formed, as part of a further example of the high-frequency devices according to the first embodiment of the present invention.
Figure 4B:
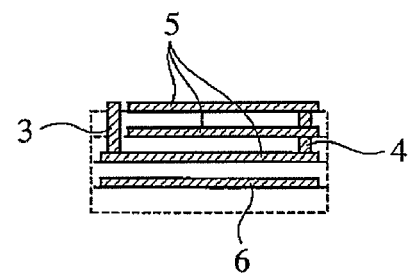
FIG. 4(b) is a view showing the lamination structure of the first transmission line of FIG. 4(a).

FIG. 4 shows a still further example of forming at least part of a first transmission line spirally with a lamination direction as a center axis. FIG. 4(*a*) shows a ground electrode and conductor patterns on first to fourth layers, and FIG. 4(*b*) shows the lamination structure of the ground electrode and the conductor patterns on the first to fourth layers [viewed from the left in FIG. 4(*a*)]. In FIG. 4(*b*), via-electrodes connected to layers above the fourth layer are omitted. Pluralities of conductor patterns 5 formed on the fourth to second layers are connected in series through via-electrodes 4, to form the first transmission line in the form of a spiral with a lamination direction as a center axis. In the example shown in FIG. 4, the first end 1 of the first transmission line is closer to a semiconductor device, oppositely to the structure shown in FIG. 2.

The connection of a semiconductor device (not shown) in the high-frequency amplifier to the first end 1 of the first transmission line is achieved through a connecting line when the semiconductor device is disposed on the fourth layer, or through a via-electrode when the semiconductor device is disposed on a layer above the fourth layer. A C-shaped conductor pattern 5 formed on the fourth layer is connected in series to a C-shaped conductor pattern formed on the third layer through a via-electrode 4, which is then connected in series to a C-shaped conductor pattern formed on the second layer through a via-electrode, thereby forming a first transmission line in the form of a spiral with a lamination direction as a center axis. In the example shown in FIG. 4, because the first end 1 of the first transmission line is located at a lamination position closest to the semiconductor device, the first transmission line is spiraled in a direction from the fourth layer to the second layer. Although the second end 2 of the first transmission line may be connected to a conductor pattern for the transmission line formed on a layer (for instance, a layer having the semiconductor device) above the third layer through a via-electrode 3 as shown in FIG. 4, it may be connected to a downstream circuit on a first dielectric layer. In this case, a circuits downstream of the output-matching circuit can be connected at a position distant from the semiconductor device in a lamination direction.

In the example shown in FIG. 4, a ground electrode 6 is formed on the first layer, such that it overlaps pluralities of conductor patterns in a lamination direction. Because there is no ground electrode on a layer (for instance, a fifth layer) above the fourth layer, the second end 2 of the first transmission line is closer to the ground electrode than the first end 1. As a result, the characteristic impedance of the first transmission line decreases stepwise from the first end 1 on the side of the semiconductor device Q1 to the second end 2 on the side of the output terminal Po, thereby easily achieving impedance matching. The example shown in FIG. 4 is opposite to that shown in FIG. 2 in the spiral direction of the first transmission line and the arrangement of the ground electrode. The structure shown in FIG. 4 may be used as a means for partially decreasing impedance as part of the output-matching circuit. Even when there is a ground electrode on a layer above the fourth layer, the above effect can be obtained if the distance between the second end 2 of the first transmission line and the ground electrode 6 is smaller than the distance between the first end 1 and a ground electrode on an upper layer.

Figure 5A:
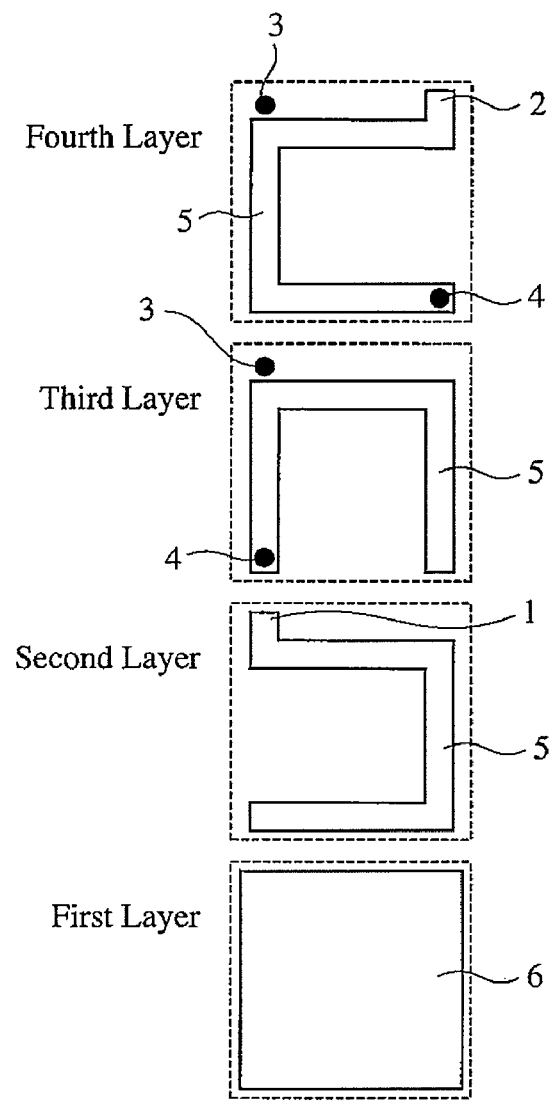
FIG. 5(a) is a development view showing dielectric layers on which conductor patterns for a first transmission line in an output-matching circuit are formed, as part of a still further example of the high-frequency devices according to the first embodiment of the present invention.
Figure 5B:
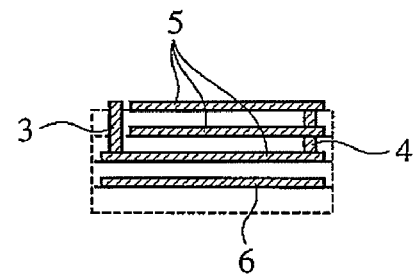
FIG. 5(b) is a view showing the lamination structure of the first transmission line of FIG. 5(a).

FIG. 5 shows a still further example of forming at least part of the first transmission line spirally with a lamination direction as a center axis. In this example, conductor patterns formed on second and third layers are wider than a conductor pattern formed on a fourth layer. When a conductor pattern having a first end 1 close to a ground electrode is wider than a conductor pattern having a second end 2 distant from the ground electrode, the conductor pattern close to the ground electrode (on the side of the first end 1) has low impedance, while the conductor pattern distant from the ground electrode (on the side of the second end 2) has high impedance. All conductor patterns need not have different widths, and at least part of conductor patterns adjacent in a lamination direction need only have width larger on the side of the ground electrode 6 as shown in FIG. 5. Of course, the width of the conductor pattern may increase gradually every dielectric layers from the side of the second end 2. The arrangement of conductor patterns having different widths is not limited to FIG. 5, but may be as shown in FIG. 3 or 4. Thus, the width change of conductor patterns also provides a first transmission line ASL having characteristic impedance increasing from the first end 1 on the side of the semiconductor device Q1 to the second end 2 on the side of the output terminal Po.

Figure 6A:
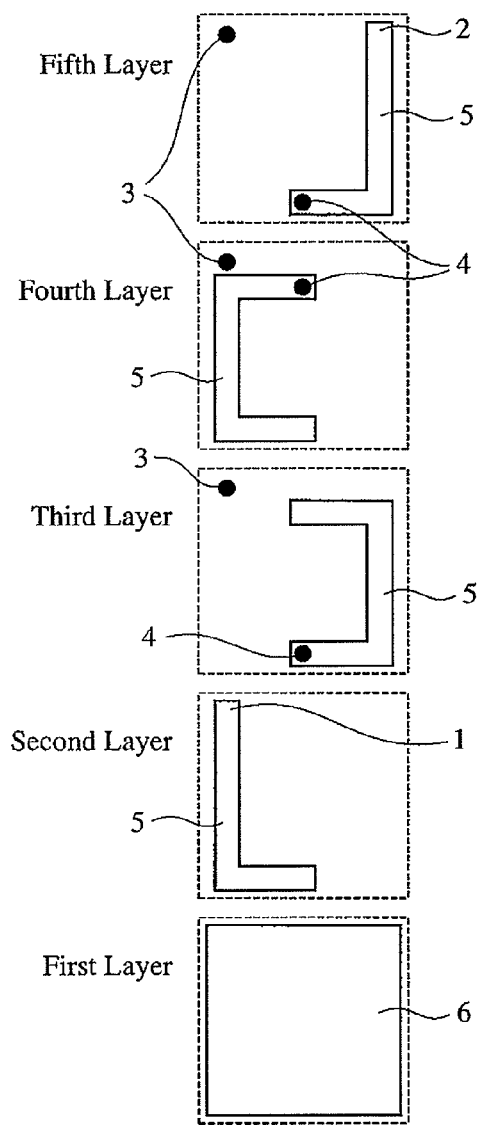
FIG. 6(a) is a development view showing dielectric layers on which conductor patterns for a first transmission line in an output-matching circuit are formed, as part of a still further example of the high-frequency devices according to the first embodiment of the present invention.
Figure 6B:
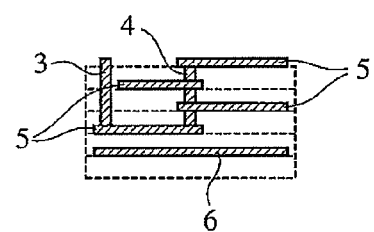
FIG. 6(b) is a view showing the lamination structure of the first transmission line of FIG. 6(a).

FIG. 6(a) shows a still further example of connecting conductor patterns spirally, and FIG. 6(b) shows the lamination structure of conductor patterns [viewed from below in FIG. 6(a)]. In the example shown in FIG. 6, L-shaped conductor patterns 5, 5 are formed on second and fifth layers, and C-shaped conductor patterns 5, 5 are formed on third and fourth layers, all conductor patterns 5, 5, 5, 5 being connected in series through via-electrodes 4, 4, 4 to form a first transmission line in the form of a spiral with a lamination direction as a center axis. Portions connected by the via-electrodes 4 include conductor portions around the via-electrodes 4. The coupling of lines can be controlled by adjusting the overlap of conductor patterns formed on adjacent dielectric layers. In the example shown in FIG. 6, the conductor patterns 5, 5 formed on adjacent dielectric layers overlap in a lamination direction only in portions connected by the via-electrodes 4, resulting in little coupling between the lines. Although conductor patterns overlap in a lamination direction between the second and fourth layers, and between the third and fifth layers, they are separate via pluralities of dielectric layers, little affecting the coupling of lines.

The thickness of dielectric layers on which conductor patterns are formed may be changed. For instance, when pluralities of dielectric layers are inserted between part of adjacent conductor patterns, the distance between adjacent conductor patterns can be changed without limitation by the layout of the multilayer substrate. Also, gaps between conductor patterns may be changed in every layers. For instance, a narrow gap between conductor patterns provides electric length smaller than the pattern length, thereby providing an inductance element with high-Q, narrow-band characteristics. Oppositely, a wide gap between conductor patterns provides electric length larger than the pattern length, thereby providing an inductance element with low-Q, wide-band characteristics.

Strictly speaking, the first and second ends 1, 2 of the first transmission line ASL formed by the series connection of conductor patterns are the ends of a spiral portion of the first transmission line ASL, not necessarily the ends of the first transmission line ASL per se. When the first transmission line ASL is entirely spiral, the ends of the first transmission line ASL correspond to the first and second ends 1, 2, and the spiral portion is often connected to a semiconductor device or an output terminal Po via an additional transmission line. In this case, the ends of the connecting transmission line are not called first and second ends 1, 2. The reference numerals 1 and 2 are attached to the ends of the first transmission line ASL in FIG. 1, etc., only for convenience of indicating its ends. When there is a connecting transmission line outside the spiral portion, it should be understood that the reference numerals 1 and 2 are attached to positions slightly inside the ends of the first transmission line ASL (end positions of the spiral portion).

(B) Other Circuits

Explanation will be made on a high-frequency amplifier circuit in the high-frequency circuit shown in FIG. 1. The first end 1 of the first transmission line ASL is connected to a drain D of a switching field effect transistor (FET) Q1, one of semiconductor devices. FET Q1 has a source grounded, and a gate connected to a collector of a switching bipolar element (B-Tr) Q2.

A connection point of the first end 1 of the first transmission line ASL and the drain D of FET Q1 is grounded via a series circuit comprising an inductor SL1 formed by a λ/4 strip line, etc. and a capacitor Ca5, and a connection point of the inductor SL1 and the capacitor Ca5 is connected to a drain voltage terminal Vdd1. A connection point of the gate of FET Q1 and the collector of B-Tr Q2 is grounded via a capacitor Ca6, and connected to a gate voltage terminal Vg.

B-Tr Q2 has an emitter grounded, and a base connected to one end of a transmission line SL3. The collector of B-Tr Q2 is grounded via a series circuit comprising an inductor SL2 formed by a strip line, etc. and a capacitor Ca7, and a connection point of the inductor SL2 and the capacitor Ca7 is connected to a collector voltage terminal Vc. A connection point of the inductor SL2 and the capacitor Ca7 is also connected to a connection point of the base of B-Tr Q2 and the transmission line SL3. The other end of the transmission line SL3 is grounded via a capacitor Cab, and connected to an input terminal Pin.

Transmission lines and inductors in the equivalent circuit shown in FIG. 1 are mostly formed by strip lines, but they may be formed by microstrip lines, coplanar guidelines, etc. A semiconductor device Q3 and a power supply circuit may be added to the amplifier circuit to constitute a 3-stage-or-more, high-power amplifier. With respect to the transistor, Q1 is FET, and Q2 is B-Tr, but other transistors such as Si-MOS-FET, GaAs FET, Si bipolar transistor, GaAs HBT (hetero-connected bipolar transistor), HEMT (high electron mobility transistor), MMIC (monolithic microwave integrated circuit), etc. may be used. The transmission line SL3 and the transistor Q2 are directly connected in this example, but they may be connected via a resistor. The inductors SL1, SL2 are not limited to strip lines, but may be formed by resistors, ferrite beads, coreless coils, etc., and it is preferable to use elements having lower DC resistance as nearing the output side.

To detect high-frequency power, the high-frequency circuit may be provided with a coupler comprising coupled main line and sub-line, which are called coupling transmission lines. The coupler may be disposed, for instance, on the output side of the output-matching circuit, or at least part of the first transmission line in the output-matching circuit may be used as a main line to integrate the output-matching circuit with the coupler (composite coupler). In the composite coupler, a main line and a sub-line are preferably formed in the multilayer substrate. At least part of electrode patterns constituting the main line and the sub-line may be opposing on a dielectric layer, or opposing in a lamination direction via a dielectric layer. With an insulating material such as ceramic between both lines, there is no likelihood of short-circuiting even when the gap between both lines is reduced for miniaturization and high coupling. Because the thickness of a dielectric layer can be controlled with high precision, both lines are preferably arranged in a lamination direction via a dielectric layer when their gap is reduced.

In the case of arrangement in a lamination direction, an electrode pattern for the sub-line preferably does not extend outside an electrode pattern for the main line, when the multilayer substrate is viewed from above. Specifically, the electrode pattern for the sub-line is preferably positioned inside the width of the electrode pattern for the main line. Even when there is positional deviation to some extent between the electrode pattern for the main line and the electrode pattern for the sub-line, such arrangement keeps the gap between both lines substantially unchanged, thereby suppressing the change of coupling.

(C) High-Frequency Device (Composite Laminate Module)

Figure 7:
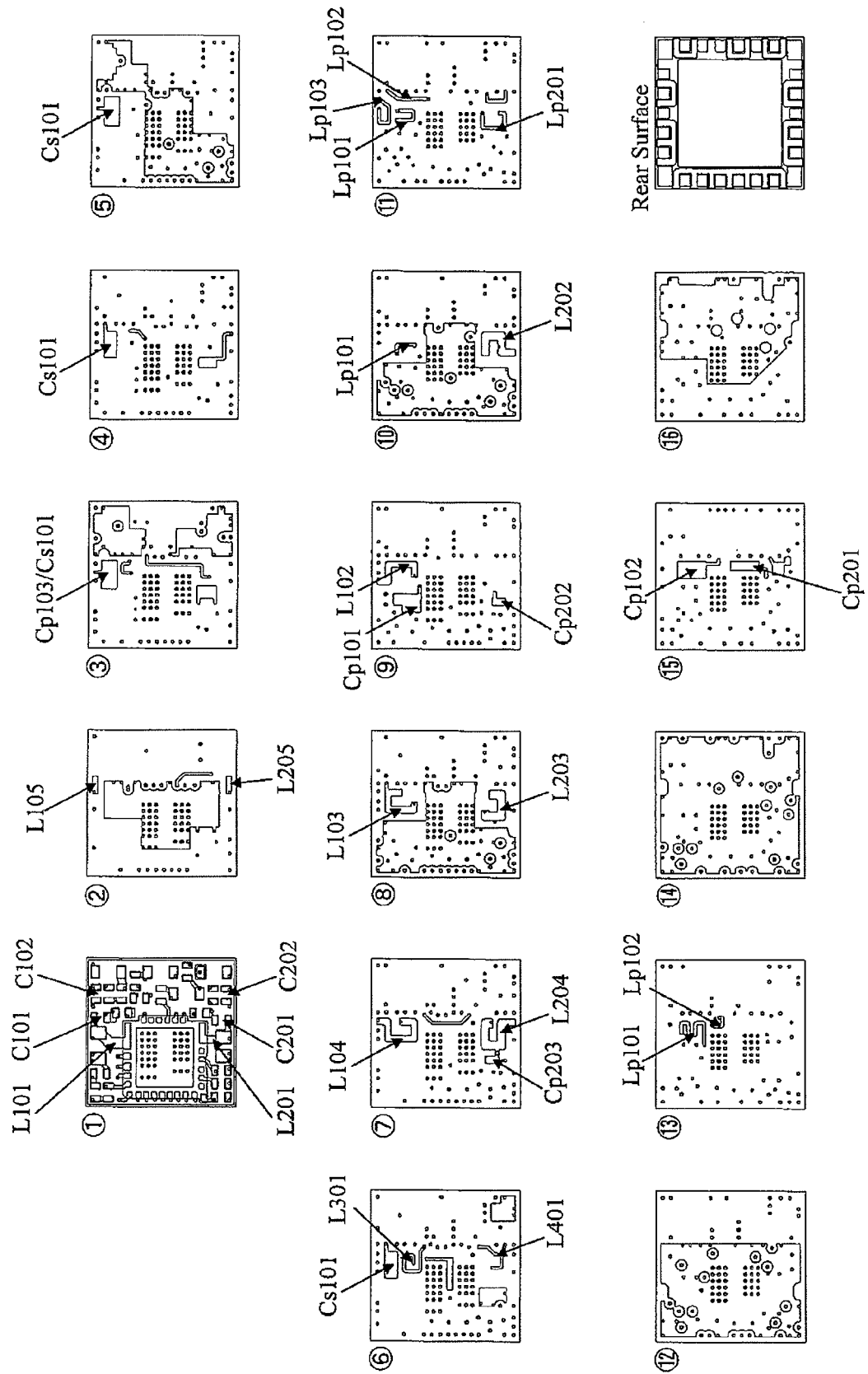
FIG. 7 is a development view showing the high-frequency device according to the first embodiment of the present invention.

The high-frequency device of the present invention is obtained by forming the above high-frequency circuit in and on a multilayer substrate constituted by pluralities of dielectric layers. FIG. 7 shows part of a multi-band, high-frequency, composite laminate device as one example of the high-frequency devices. Transmission lines such as the first transmission line, etc. and part of capacitors are formed in the multilayer substrate constituted by dielectric layers. All elements constituting the output-matching circuit may be contained in the multilayer substrate. In this case, the reduction of an area for mounting parts, the miniaturization of the high-frequency device, cost reduction due to decrease in the number of mounted parts, the reduction of the number and cost of mounting steps, etc. are expected. The high-frequency circuit is formed in and on a ceramic multilayer substrate in this embodiment, but part of the circuit may be formed, for instance, on a semiconductor substrate.

Figure 8:
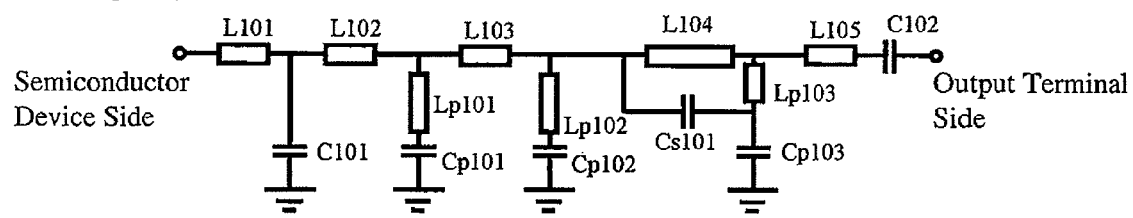
FIG. 8 is a view showing one example of output-matching circuits used in the high-frequency device according to the first embodiment of the present invention.
Figure 8:
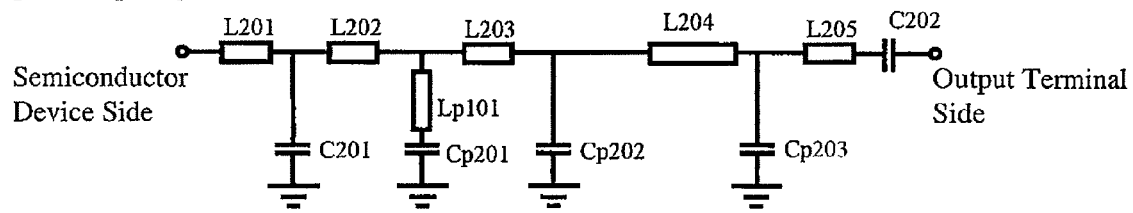
Figure 14:
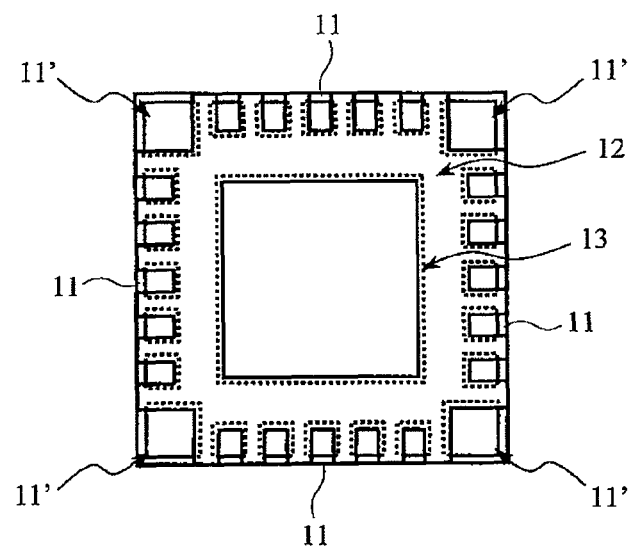
FIG. 14 is a bottom view showing terminal electrodes and an overcoat layer formed on a rear surface of the high-frequency device.

FIG. 7 shows 16 dielectric layers constituting the ceramic multilayer substrate, on which electrode patterns constituting the output-matching circuit shown in FIG. 8 are formed. FIG. 7 shows a first layer (surface layer) to a fifth layer from the left in an upper row, a sixth layer to an eleventh layer from the left in a middle row, and a twelfth layer to a sixteenth layer from the left in a lower row. The right end in a lower row shows a rear surface of the multilayer substrate. The same symbols are assigned to the electrode patterns in FIG. 7 corresponding to the circuit elements in FIG. 8. The rear surface of the multilayer substrate is, as shown in FIG. 14, provided with a center ground electrode 13, and terminal electrodes 11 along four sides, terminal electrodes 11' at the corners being larger than other terminal electrodes 11. On the rear surface, portions of the terminal electrodes 11, 11', which do not face the side surfaces of the multilayer substrate, are covered with an overcoat layer 12. The partial covering of the terminal electrodes 11, 11' with the overcoat layer 12 improves their adhesion. Because the terminal electrodes 11' at the corners are larger than the other terminal electrodes 11, even the covering of their two edges with the overcoat layer 12 secures enough adhesion. Because only two edges of the terminal electrodes 11' at the corners should be covered with the overcoat layer 12, the terminal electrodes can be disposed with high integration.

Figure 15A:
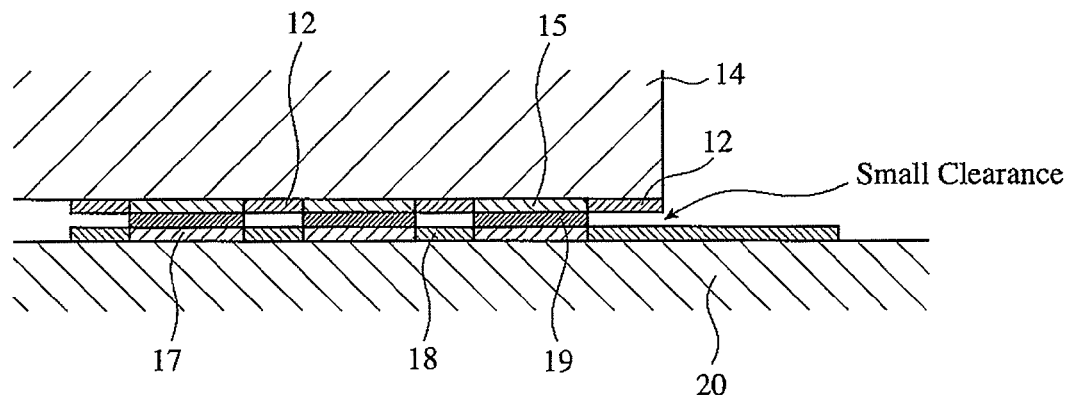
FIG. 15(a) is a partial cross-sectional view showing one example of the high-frequency devices mounted on a printed circuit board.
Figure 15B:
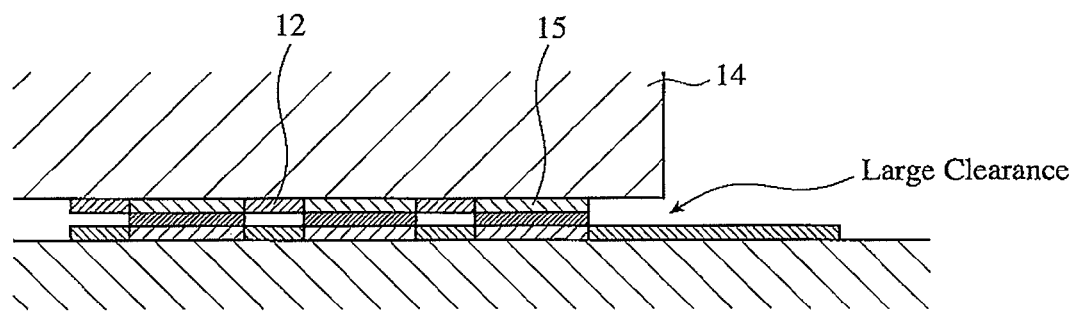
FIG. 15(b) is a partial cross-sectional view showing another example of the high-frequency devices mounted on a printed circuit board.

FIG. 15 schematically shows a high-frequency device mounted on a printed circuit board (main board) of a mobile terminal, etc. Terminals 15 of the high-frequency device 14 and terminals 17 of the main board 20 are connected by a solder 19. The high-frequency device 14 is covered with the overcoat layer 12 except for the terminals 15, and the main board 20 is covered with a resist layer 18 except for the terminals 17. When a large external force by drop impact, etc. is applied to deform the main board 20 in a state where the high-frequency device 14 is mounted on the main board 20, small clearance as shown in FIG. 15(a) may cause physical interference between the main board 20 and the mounted high-frequency device 14, the concentration of stress to connecting terminals, etc., breaking their terminal surfaces. On the other hand, when there is no overcoat layer 16 at the corners of the high-frequency device 14, there is large clearance at the corners as shown in FIG. 15(b), avoiding physical interference with the main board 20 and thus securing the reliability of terminal connection. As long as the high-frequency device has terminals on a rear surface, this structure can be used regardless of the structure of the high-frequency circuit in the device.

As shown in FIG. 7, conductor patterns, which may be called "electrode patterns," constituting the transmission lines of the output-matching circuit are L101-L105 and Lp101-103 on the lower frequency side, and L201-L205 and Lp201 on the higher frequency side. Among them, L101-

L105 and L201-L205 constitute the first transmission line ASL on the lower frequency side and the higher frequency side. L102-L104 constitute a lower-frequency-side spiral portion of the first transmission line ASL, and L202-L204 constitute a higher-frequency-side spiral portion of the first transmission line ASL. Electrode patterns constituting capacitors are C101-C102, Cp101-103 and Cs101 on the lower frequency side, and C201-C202 and Cp201-203 on the higher frequency side.

Figure 12:
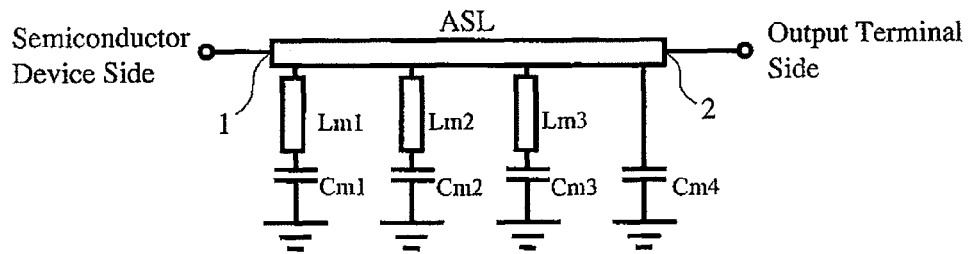
FIG. 12 is a view showing another example of output-matching circuits used in the high-frequency device according to the first embodiment of the present invention.

The output-matching circuit shown in FIG. 8 comprises capacitors and other transmission lines in addition to the first transmission line ASL. FIG. 12 shows another example of the output-matching circuits. This output-matching circuit comprises a first transmission line ASL, and pluralities of first capacitors Cm1, Cm2, Cm3 and Cm4 each having one end branch-connected to the first transmission line ASL and the other end grounded. Each second transmission line Lm1, Lm2, Lm3 is connected in series between each capacitor Cm1, Cm2, Cm3 and the first transmission line ASL. The output-matching circuit shown in FIG. 12 has impedance necessary for output matching by a combination of transmission lines and capacitors, and acts as a series resonance circuit. Each combination of the transmission line Lm1 and the capacitor Cm1, the transmission line Lm2 and the capacitor Cm2, and the transmission line Lm3 and the capacitor Cm3 constitutes a series resonance circuit of inductance and capacitance, drastically attenuating unnecessary bands. For instance, by adjusting the resonance frequency of the series resonance circuit to n times (n is a natural number of 2 or more) the frequency f of high-frequency power passing the output-matching circuit, n-th harmonics such as a 2f band, a 3f band, etc. are attenuated. The resonance frequencies of the resonance circuits disposed in the output-matching circuit are preferably equal to the frequencies of a second harmonic, a third harmonic, and a fourth harmonic in this order from the input side (on the semiconductor device side) of the output-matching circuit. Although the capacitor Cm4 may be positioned on the semiconductor device side, it is preferably positioned on the output terminal side as shown in FIG. 12 to reduce loss. A series resonance function can also be obtained by the example shown in FIG. 8.

Figure 13:
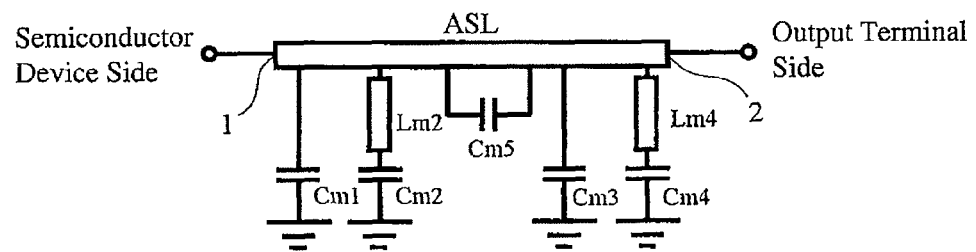
FIG. 13 is a view showing a further example of output-matching circuits used in the high-frequency device according to the first embodiment of the present invention.

FIG. 13 shows a further example of the output-matching circuits. In this example, branch-connected to a first transmission line ASL are a capacitor Cm1, a series resonance circuit of a transmission line Lm2 and a capacitor Cm2, a capacitor Cm3, and a series resonance circuit of a transmission line Lm4 and a capacitor Cm4 in this order from the input side (on the semiconductor device side). Further, a capacitor Cm5 is connected in parallel to the first transmission line ASL to constitute a parallel resonance circuit, between the series resonance circuit of the transmission line Lm2 and the capacitor Cm2 and the series resonance circuit of the transmission line Lm4 and the capacitor Cm4. Such arrangement of a parallel resonance circuit between series resonance circuits reduces transmission loss and improves attenuation characteristics. To obtain excellent attenuation characteristics, there is preferably a gap of $\lambda/40$ or more, between the parallel resonance circuit constituted by part of the first transmission line ASL and the capacitor Cm5, and a connection point of the first transmission line ASL and the series resonance circuit constituted by the transmission line Lm4 and the capacitor Cm4.

As shown in FIG. 7, the first, ninth, eighth, seventh and second layers have conductor patterns L101, L102, L103, L104 and L105 for the first transmission line on the lower frequency side, and the conductor patterns L102, L103 and L104 are spirally connected through via-electrodes. A semiconductor device connected to the conductor pattern L101 is mounted on the first layer. The first, tenth, eighth, seventh and second layers have conductor patterns L201, L202, L203, L204 and L205 for the first transmission line on the higher frequency side, and the conductor patterns L202, L203 and L204 are spirally connected through via-electrodes. The conductor pattern L101 is connected to the semiconductor device on the first layer.

Although the first transmission line ASL may be constituted by one line, it is preferably formed by connecting pluralities of conductor patterns on pluralities of dielectric layers in series. In the example shown in FIG. 7, the first transmission line ASL is spirally formed from a lower layer (the ninth layer on the lower frequency side, and the tenth layer on the higher frequency side) to an upper layer (the second layer on both lower frequency side and higher frequency side). For instance, with respect to the first transmission line ASL on the lower frequency side, the conductor pattern L102 closest to the semiconductor device among pluralities of conductor patterns constituting its spiral portion is formed on the ninth layer, closest to a ground electrode on the twelfth layer, and the conductor patterns L103 and L104 are disposed on the eighth and seventh layers successively away from the ground electrode. In the output-matching circuit having an impedance-converting function, impedance should be low on the input side and substantially 50Ω on the output side, and this condition can be easily achieved by the above arrangement. This is true of the first transmission line ASL on the higher frequency side.

The change of the first transmission line ASL from a conventional straight or meandering structure to a spiral lamination structure strengthens electromagnetic coupling between the lines, thereby reducing the line length. This is advantageous for the miniaturization of the high-frequency device. Also, because conductor patterns are disposed without an interposing ground electrode in the example shown in FIG. 7, the line is short unlike when conductor patterns and ground electrodes are laminated alternately to make the impedance of the transmission line constant.

The conductor pattern L104, part of the first transmission line on the lower frequency side, acts as a main line of the coupler, opposing the conductor pattern 301 as a sub-line. The conductor pattern L204, part of the first transmission line on the higher frequency side, acts as a main line of the coupler, opposing the conductor pattern 401 as a sub-line. Thus, electrode patterns for the main line and sub-line of the coupler are opposing via a dielectric layer in a lamination direction. The spiral portion of the first transmission line and the coupler are disposed between a ground electrode on the twelfth layer and a ground electrode on the second layer. In FIG. 7, other conductor patterns constituting an input matching circuit, interstage matching circuits, a power supply circuit, etc. are omitted for the simplicity of explanation.

As one example of the high-frequency devices of the present invention, a structure having the output-matching circuit, to which an antenna switch module comprising a switch circuit for switching the connection of a transmission system and a receiving system is connected, will be explained. There should be impedance matching of, for instance, substantially 50Ω between the output-matching circuit and the antenna switch module.

Figure 9:
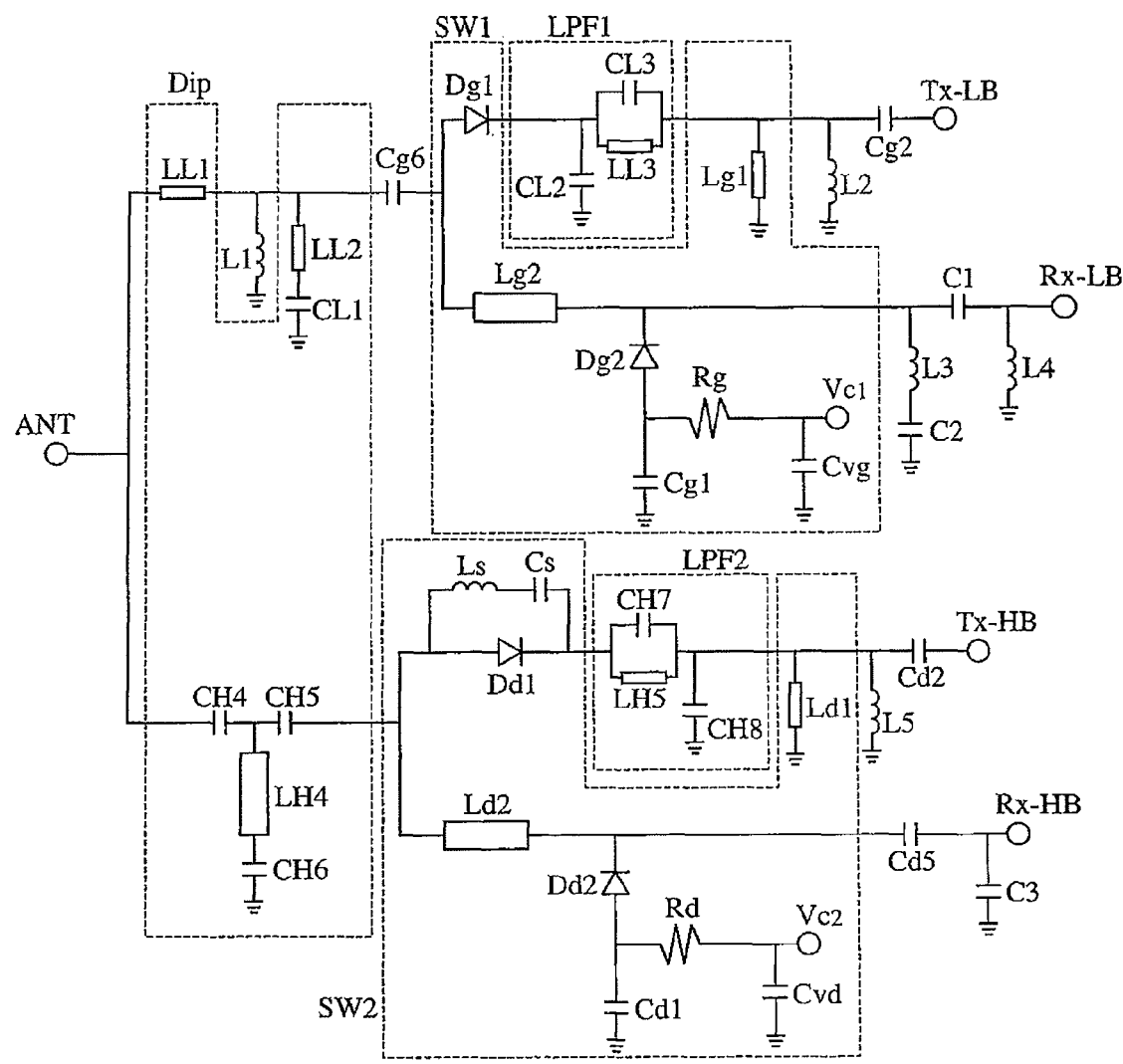
FIG. 9 is a view showing one example of the equivalent circuits of the high-frequency circuit according to the first embodiment of the present invention.

FIG. 9 shows one example of the equivalent circuits of a quadband antenna switch module, which can be used in the high-frequency device of the present invention. This antenna switch module uses a GSM850 band (transmission frequency: 824-849 MHz, and receiving frequency: 869-894 MHz) and an EGSM band (transmission frequency: 880-915

MHz, and receiving frequency: 925-960 MHz) in a low-frequency band, and a DCS band (transmission frequency: 1710-1785 MHz, and receiving frequency: 1805-1880 MHz) and a PCS band (transmission frequency: 1850-1910 MHz, and receiving frequency: 1930-1990 MHz) in a high-frequency band. In addition to these bands, a PDC800 band (810-960 MHz), a GPS band (1575.42 MHz), a PHS band (1895-1920 MHz), a Bluetooth band (2400-2484 MHz), CDMA2000, TD-SCDMA, etc. are also usable. Of course, the antenna switch module is not limited to quadband, but may be a triple- or dual-band.

The antenna switch module shown in FIG. 9 comprises a diplexer Dip constituted by a lower-frequency-side filter and a higher-frequency-side filter, a first switch circuit SW1 disposed downstream of the lower-frequency-side filter of the diplexer Dip for switching a transmission terminal Tx-LB and a receiving terminal Rx-LB by voltage supplied from a control terminal Vc, and a second switch circuit SW2 disposed downstream of the higher-frequency-side filter of the diplexer Dip for switching a transmission terminal Tx-HB and a receiving terminal Rx-HB by voltage supplied from a control terminal Vc. The transmission terminal Tx-LB and the receiving terminal Rx-LB on the lower frequency side are used for GSM and EGSM, and the transmission terminal Tx-HB and the receiving terminal Rx-HB on the higher frequency side are used for DCS and PCS. The receiving terminal Rx-LB on the lower frequency side and the receiving terminal Rx-HB on the higher frequency side are selectively used depending on an area where a mobile terminal having this module is used. For instance, Rx-LB and Rx-HB are used for EGSM and DCS, respectively in Europe, and for GSM and PCS, respectively in the US. Switch circuits may be further disposed downstream of the receiving terminals Rx-LB and Rx-HB to have four receiving terminals.

The diplexer Dip connected to an antenna terminal ANT comprises a lower-frequency-side filter passing transmitting and receiving signals of GSM and EGSM but attenuating transmitting and receiving signals of DCS and PCS, and a higher-frequency-side filter passing the transmitting and receiving signals of DCS and PCS but attenuating the transmitting and receiving signals of GSM and EGSM. The lower-frequency-side filter and the higher-frequency-side filter are respectively constituted by a lowpass filter and a highpass filter each comprising transmission lines and capacitors, but they may be constituted by a bandpass filter or a notch filter.

In the lowpass filter as a lower-frequency-side filter, a transmission line LL1 passes signals in GSM and EGSM bands on the lower frequency side with low loss, but acts as high impedance to signals in DCS and PCS bands on the higher frequency side to block them. A transmission line LL2 and a capacitor CL1 constitutes a series resonance circuit having a resonance frequency in DCS and PCS bands, to lead signals in DCS and PCS bands to the ground. In the highpass filter as a higher-frequency-side filter, capacitors CH4, CH5 pass signals in the DCS and PCS bands on the higher frequency side with low loss, but acts as high impedance to signals in the GSM and EGSM bands on the lower frequency side to block them. A transmission line LH4 and a capacitor CH6 constitutes a series resonance circuit having a resonance frequency in the GSM and EGSM bands, to lead signals in the GSM and EGSM bands to the ground.

Each of the first switch circuit SW1 for switching the transmission terminal Tx-LB and the receiving terminal Rx-LB, and the second switch circuit SW2 for switching the transmission terminal Tx-HB and the receiving terminal Rx-HB comprises switch elements and transmission lines as main elements. The switch element is preferably a PIN diode, but may be an FET switch, for instance, an SPnT-type FET switch such as SPDT (single pole dual throw) and SP3T, a GaAs switch such as pHEMT and MES-FET, etc. Although a switch circuit using a PIN diode is less expensive than a GaAs switch, the GaAs switch has low power consumption than the switch circuit using a PIN diode. They are thus selected to exhibit these advantages.

The first switch circuit SW1 for switching the transmission terminal Tx-LB of GSM/EGSM and the receiving terminal Rx-LB of GSM/EGSM comprises two diodes Dg1, Dg2 and two transmission lines Lg1, Lg2 as main elements. The diode Dg1 has an anode connected to the lower-frequency-side filter of the diplexer Dip, and a cathode connected to an L-type lowpass filter LPF 1 constituted by a transmission line LL3 and capacitors CL2, CL3. A transmission line Lg1 is connected between an end of the transmission line LL3 on the side of Tx-LB and the ground. The transmission line Lg1 may be replaced by a choke coil having such inductance (desirably about 10-100 nH) that the ground level is regarded as open (high impedance) in a low-frequency band. The transmission line Lg1 also has a function of adjusting the impedance on the transmission end side of the lowpass filter, preferably longer than necessary in the case of a n-type lowpass filter.

The lowpass filter LPF1 preferably has such characteristics of passing the transmitting signals of GSM/EGSM input from a power amplifier (not shown) for GSM/EGSM, while sufficiently attenuating harmonic distortions contained therein. The transmission line LL3 having inductance and the capacitor CL3 constitutes a parallel resonance circuit having a resonance frequency which is 2 or 3 times the transmission frequency of GSM/EGSM. In this example, to attenuate harmonic distortions contained in the transmitting signals of GSM/EGSM input from a power amplifier sufficiently, the resonance frequency is set about 3 times.

Two stages of the above parallel resonance circuits may be connected. In this case, it is preferable that a parallel resonance circuit on the transmission terminal side has a resonance frequency 3 times the transmission frequency, and that a parallel resonance circuit on the antenna terminal side has a resonance frequency 2 times the transmission frequency. Instead of connecting a grounded capacitance to both ends of two parallel resonance circuits, a grounded capacitance may be disposed at a connecting point of two parallel resonance circuits, providing proper impedance phase matching between the antenna switch module and the high-frequency device (high-frequency amplifier module) comprising the semiconductor device and the output-matching circuit, thereby reducing unnecessary harmonics emitted from the antenna. In the case of the two-stage parallel resonance circuit, to suppress interference between two adjacent spiral transmission lines, their spiral directions are preferably opposite. Two spiral transmission lines with opposite spiral directions are about 10% shorter than those with the same spiral direction, thereby achieving miniaturization and line loss reduction. Wiring with opposite spiral directions is applicable not only to the lowpass filter, but also to other transmission lines, particularly its line length reduction effect is effective for relatively long transmission lines such as a λ/4 line, etc.

Capacitors Cg6, Cg2, Cg1 have a DC-cutting function and a phase-adjusting function. With the DC-cutting function, a control DC voltage can be applied to a circuit comprising diodes Dg1 and Dg2. A transmission line Lg2 is disposed between an anode of the diode Dg1 and the receiving terminal Rx-LB, and the diode Dg2 and the capacitor Cg1 are disposed between the transmission line Lg2 and the ground. The capacitor Cg1 has such capacitance of causing series resonance in a used frequency band to cancel the parasitic inductance of a diode. A resistor Rg for controlling bias current for the diode Dg2 is series-connected between the anode of the diode Dg2 and a control terminal Vc1. The resistor Rg is 100-200Ω in this example, though it may be properly changed depending on the circuit structure. A capacitor Cvg connected between the control terminal Vc1 and the ground blocks noise from entering the control power supply. Any of the transmission lines Lg1 and Lg2 preferably has such length as to provide a resonance frequency within the frequency band of the transmitting signals of GSM/EGSM, thereby permitting a function as a λ/4 resonator. For instance, when the resonance frequency of the transmission lines Lg1 and Lg2 is substantially an intermediate frequency (869.5 MHz) of the transmission frequency of GSM, excellent insertion loss characteristics can be obtained in the desired frequency band.

When the control power supply Vc1 is high, both diodes Dg1 and Dg2 are in an ON state, a connection point of the diode Dg2 and the transmission line Lg2 being on the ground level, and the transmission line Lg2, a λ/4 resonator, having infinite impedance. Accordingly, when the control power supply Vc1 is high, signals cannot pass through a path from the diplexer Dip to the lower-frequency-side, receiving terminal Rx-LB, while signals can pass through a path from the diplexer Dip to the lower-frequency-side, transmission terminal Tx-LB. On the other hand, when the control power supply Vc1 is low, the diodes Dg1 and Dg2 are in an OFF state, so that signals cannot pass through a path from the diplexer Dip to the lower-frequency-side, transmission terminal Tx-LB, while signals can pass through a path from the diplexer Dip to the lower-frequency-side, receiving terminal Rx-LB. With the above structure, the transmission and reception of lower-frequency-side signals are switched.

The second switch circuit SW2 for switching the receiving terminal Rx-HB for DCS and PCS and the transmission terminal Tx-HB for DCS and PCS comprises two diodes Dd1 and Dd2 and two transmission lines Ld1 and Ld2 as main elements. The diode Dd1 has an anode connected to the higher-frequency-side filter of the diplexer Dip, and a cathode connected to an L-type lowpass filter LPF2 constituted by a transmission line LH5 and capacitors CH7, CH8. A transmission line Ld1 is connected between an end of the transmission line LH5 on the Tx-HB side and the ground. The transmission line Ld1 may be replaced by a choke coil having such inductance (desirably about 5-60 nH) that the ground level is regarded as open (high impedance) in a high-frequency band. The transmission line Ld1 also has a function of adjusting the impedance on the transmission end side of the lowpass filter LPF2, preferably longer than necessary in the case of a π-type lowpass filter. The lowpass filter LPF2 preferably has such characteristics of passing transmitting signals input from a power amplifier (not shown) for DCS and PCS, while sufficiently attenuating harmonic distortions (second or more) contained therein. A series circuit of an inductor Ls and a capacitor Cs parallel-connected to the diode Dd1 cancels the capacitance of the diode Dd1 in an OFF state, thereby securing isolation between the transmission terminal Tx-HB and the antenna terminal ANT, and between the transmission terminal Tx-HB and the receiving terminal Rx-HB.

To act as λ/4 resonators, the transmission lines Ld1 and Ld2 preferably have such length that their resonance frequencies are within the frequency band of transmitting signals of DCS and PCS, particularly such length that their resonance frequencies are within the intermediate frequency of transmitting signals. For instance, when the resonance frequency of the transmission lines Ld1 and Ld2 is substantially the intermediate frequency (1810 MHz) of transmission frequency in a DCS band and a PCS band, two transmitting signals can be handled by one circuit.

A capacitor Cd2 has a DC-cutting function and a phase-adjusting function. Because of the DC-cutting function, a control DC voltage can be applied to a circuit comprising diodes Dd1 and Dd2. The transmission line Ld2 has one end connected to the capacitor CH5 constituting the higher-frequency-side filter of the diplexer Dip, and the other end connected to the ground via a diode Dd2 and a capacitor Cd1. The capacitor Cd1 has such capacitance as to cause series resonance in a used frequency band, thereby canceling the parasitic inductance of the diode Dd2. An anode of the diode Dd2 is connected to a control terminal Vc2 via a resistor Rd. The resistor Rd is 100-200Ω to control bias current for the diode Dd2 in this example, though it may be properly changed depending on the circuit structure. A capacitor Cvd blocks noise from entering the control power supply. A capacitor Cd5 is for DC-cutting.

When the control power supply Vc2 is high, both diodes Dd1, Dd2 are in an ON state, a connection point of the diode Dd2 and the transmission line Ld2 being on the ground level, and the transmission line Ld2, a 214 resonator, having infinite impedance. Accordingly, when the control power supply Vc2 is high, signals cannot pass through a path from the diplexer Dip to the higher-frequency-side, receiving terminal Rx-HB, while signals can pass through a path from the diplexer Dip to the higher-frequency-side transmission terminal Tx-HB. On the other hand, when the control terminal Vc2 is low, the diodes Dd1 and Dd2 are in an OFF state, so that signals cannot pass through a path from the diplexer Dip to the higher-frequency-side transmission terminal Tx-HB, while signals can pass through a path from the diplexer Dip to the higher-frequency-side, receiving terminal Rx-HB.

When overcurrent due to static electricity, thunderbolt, etc. flows through the antenna terminal ANT, an inductor L1 permits the overcurrent to escape to the ground, thereby preventing the breakage of the module. An inductor L2 and a capacitor Cg2, and an inductor L5 and a capacitor Cd2 respectively act as highpass, phase-adjusting circuits for suppressing harmonics from leaking from the high-frequency amplifier circuit RM. Adjusting provides conjugated matching in a fundamental wave, and non-conjugated matching in unnecessary n-th harmonics, with the impedance of the antenna switch. L3, C2, L4 and C1 constitute an LC resonance circuit and an LC highpass circuit, with a resonance point near 250 MHz to attenuate electrostatic pulses, thereby preventing the electrostatic pulses from entering the receiving terminal. C3 is a matching-adjusting capacitor.

The first and second lowpass filters LPF1, LPF2 for removing harmonic distortions contained in transmitting signals are preferably disposed in the transmission path, though not indispensable. In the example shown in FIG. 9, the first lowpass filter LPF1 is disposed between the first diode Dg1 and the transmission line Lg1 in the first switch circuit SW1, but it may be disposed between the diplexer Dip and the first switch circuit SW1, or between the transmission line Lg1 and the lower-frequency-side transmission terminal Tx-LB. Likewise, the second lowpass filter LPF2 may be disposed between the diplexer Dip and the second switch circuit SW2, or between the transmission line Ld1 and the higher-frequency-side transmission terminal Tx-HB. In short, the first and second lowpass filters LPF1, LPF2 may be disposed anywhere in the transmission path between the diplexer Dip and the transmission terminal Tx, through which transmitting signals pass. In the second lowpass filter LPF2, when a grounded capacitor is connected in parallel to the transmission line Ld1 to constitute a parallel resonance circuit, the transmission line Ld1 may be shorter than λ/4. Also, the use of a choke coil reduces inductance.

The high-frequency side may be divided to a DCS band (transmission frequency: 1710-1785 MHz, and receiving frequency: 1805-1880 MHz) and a PCS band (transmission frequency: 1850-1910 MHz, and receiving frequency: 1930-1990 MHz), to provide a quadband antenna switch module having independent receiving terminals. Further, the lower-frequency-side may be divided to a GSM850 (transmission frequency: 824-849 MHz, and receiving frequency: 869-894 MHz) and a EGSM (transmission frequency: 880-915 MHz, and receiving frequency: 925-960 MHz), to provide a quad-band antenna switch module having all separate receiving terminals. In this case, common terminals are used in a transmission system, and a switch for switching GSM850 and EGSM or DCS and PCS is connected to a receiving system. In place of the switch, a transmission line acting as a λ/4 resonator for GSM850 or EGSM, and a transmission line acting as a λ/4 resonator for DCS or PCS may be used to divide the frequency.

Ceramic green sheets for forming dielectric layers are preferably made of LTCC sinterable at as low temperatures as 950° C. or lower. For instance, a ceramic composition comprising 10-60% by mass (calculated as $Al_2O_3$) of Al, 25-60% by mass (calculated as $SiO_2$) of Si, 7.5-50% by mass (calculated as SrO) of Sr, 20% or less by mass (calculated as $TiO_2$) of Ti, 0.1-10% by mass (calculated as $Bi_2O_3$) of Bi, 0.1-5% by mass (calculated as $Na_2O$) of Na, 0.1-5% by mass (calculated as $K_2O$) of K, 0.01-5% by mass (calculated as CuO) of Cu, and 0.01-5% by mass (calculated as $MnO_2$) of Mn is used. The green sheet is preferably as thick as 20-200 μm, such that transmission lines and capacitors are easily formed. A conductive material is preferably a silver-based paste. Formed on each green sheet with through-holes are electrode patterns for transmission lines and capacitors, and via-electrodes. Green sheets each having electrode patterns are laminated, pressure-bonded, and sintered at 950° C. to obtain a laminate (multilayer substrate). The laminate is as small as 6 mm or less in lateral length and 0.5 mm or less in height, for instance, 5.8 mm×5.8 mm×0.45 mm. The laminate has diodes, transistors, chip inductors and chip capacitors mounted on its upper surface, and covered with a metal case to provide a final product. The final product is as high as about 1.25 mm. In place of the metal case, a resin-sealing package may be used, and in this case, the product is as high as about 1.2 mm.

Figure 10:
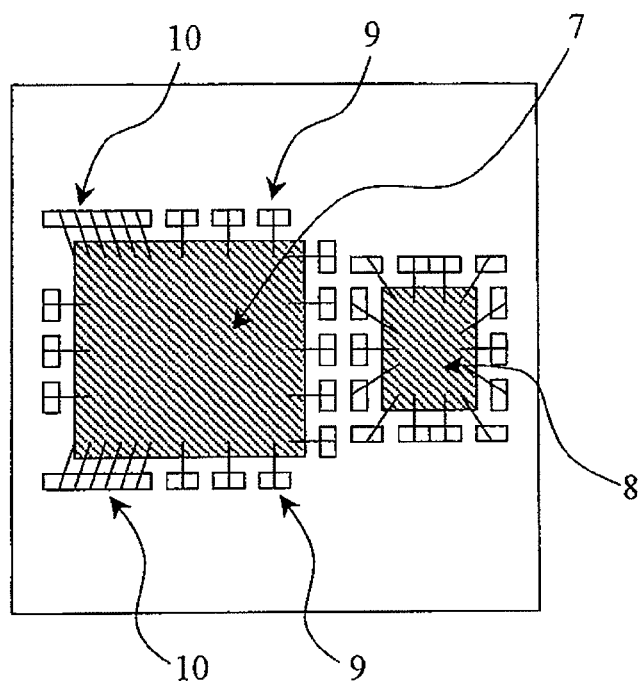
FIG. 10 is a plan view showing one example of the arrangement of bare chips mounted on a surface of the high-frequency device laminate.
Figure 11:
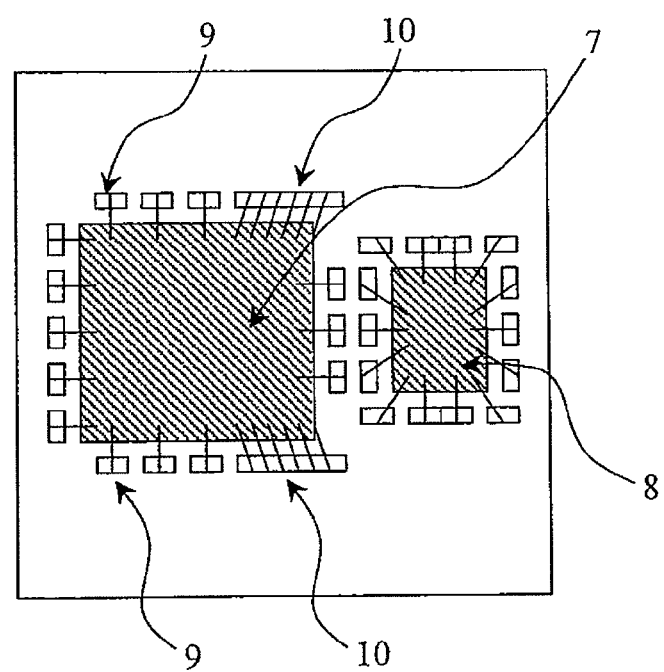
FIG. 11 is a plan view showing another example of the arrangement of bare chips mounted on a surface of the high-frequency device laminate.

Because the high-frequency amplifier and the switch circuit are connected via the output-matching circuit, higher integration has a bare chip for the high-frequency amplifier and a bare chip for the switch circuit mounted closer to each other on the multilayer substrate, wires connected thereto being also closer to each other. When the output terminals of the bare chip 7 for the high-frequency amplifier and electrodes 10 on the laminate connected to their wires are closer to the bare chip 8 for the switch circuit than the input terminals and electrodes 9 on the laminate connected to their wires as shown in FIG. 11, unnecessary signals jump from wires connected to the output terminals of the bare chip 7 for the high-frequency amplifier to wires connected to the bare chip 8 for the switch circuit by power radiation, resulting in the unstable operation of the switch circuit and noise mixing. On the other hand, when the output terminals of the bare chip 7 for the high-frequency amplifier and the electrode 10 on the laminate connected to their wires are more distant from the bare chip 8 for the switch circuit than the input terminals and the electrode 9 on the laminate connected to their wires as shown in FIG. 10, the jumping of unnecessary signals can be suppressed. In addition, because a heat-generating, final-stage amplifier in the bare chip 7 for the high-frequency amplifier is distant from the bare chip 8 for the switch circuit, the change of characteristics of the switch circuit due to temperature elevation can be prevented.

To confirm the effect of the present invention, the high-frequency device comprising the output-matching circuit of the present invention was compared with a high-frequency device comprising a conventional output-matching circuit with respect to a mounting area and transmission loss. With respect to the lower-frequency-side output-matching circuit, the conventional high-frequency device had transmission loss of 1.4 dB, needing that the total length of transmission lines was about 15 mm, and that the mounting area was about 16 $mm^2$. On the other hand, the high-frequency device of the present invention had extremely reduced transmission loss of 1.0 dB, the total length of transmission lines being as small as about 10 mm, about 65% of that of the conventional high-frequency device, and the mounting area being as small as about 4 $mm^2$, about 25% of the conventional one. These effects were also obtained with respect to the higher-frequency-side output-matching circuit. Thus, the present invention has achieved the miniaturization and high performance of the high-frequency device.

In the high-frequency device shown in FIG. 7, all green sheets are divided to two regions, electrode patterns constituting the high-frequency amplifier HPA are disposed in a left-side region, and electrode patterns constituting the antenna switch module ASM are disposed in a right-side region. This makes it possible to miniaturize the high-frequency device without deterioration of characteristics. Also, the integration of the high-frequency amplifier HPA with the antenna switch module ASM in the laminate shortens lines connecting them, and makes wiring on the printed circuit board unnecessary, resulting in the reduction of line loss. In addition, the integration of the high-frequency amplifier HPA with the antenna switch module ASM reduces the number of matching circuits disposed in them to one, and makes impedance matching easy. Accordingly, the miniaturization, loss reduction, output efficiency improvement, etc. of the high-frequency device can be achieved.

[2] Second Embodiment

Figure 16:
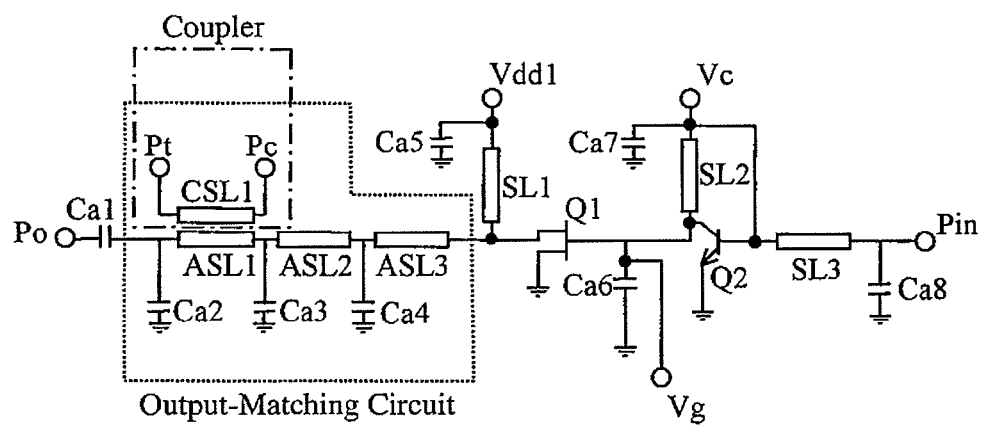
FIG. 16 is a view showing one example of the equivalent circuits of the high-frequency circuit according to the second embodiment of the present invention.

FIG. 16 shows a circuit of the high-frequency device according to the second embodiment. This high-frequency device comprises a coupler for detecting high-frequency power in an output-matching circuit. The explanation of the same structure and function as in the first embodiment will be omitted.

(A) Output-Matching Circuit

Connected between transmission line portions ASL1, ASL2 and ASL3 constituting the first transmission line ASL in the output-matching circuit are capacitors Ca2, Ca3 and Ca4 each having one end grounded. This output-matching circuit comprises a coupler for detecting high-frequency power. ASL1, part of the first transmission line ASL, is also used as a main line of the coupler, coupling with a sub-line CSL1 of the coupler. An output from the first end Pc of the sub-line CSL1 is sent to a detector to control the output power of the high-frequency amplifier HPA. The second end Pt of the sub-line CSL1 is terminated with a resistor R of generally 50Ω, though the resistance of the resistor R may be properly changed to adjust the degree of coupling and isolation.

In the example shown in FIG. 16, the coupler is part of the output-matching circuit. Because this structure makes it unnecessary to have a discrete coupler, the high-frequency device is miniaturized, and the coupler-containing output-matching circuit can achieve matching with the output terminal Po. For instance, the impedance of the main line (transmission line portion ASL1) coupled with the sub-line CSL1 in the coupler is less than 50Ω (for instance, 40Ω) on the semiconductor device side, and 50Ω on the side of the output terminal Po.

Figure 17:
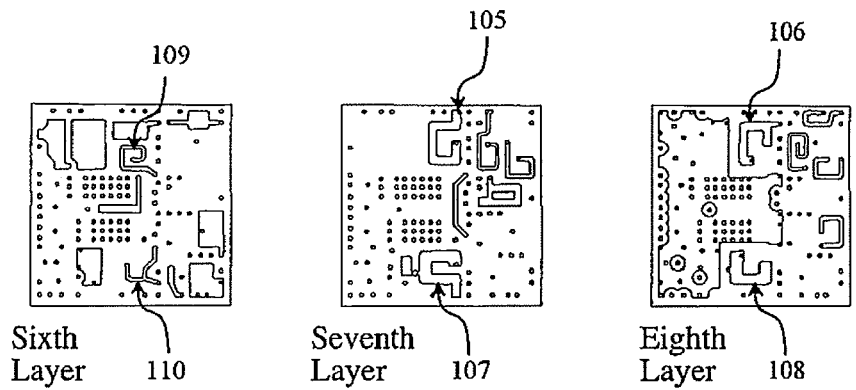
FIG. 17 is a development view showing dielectric layers on which conductor patterns for a first transmission line in an output-matching circuit are formed, as part of the high-frequency device according to the second embodiment of the present invention.

The main line (transmission line portion ASL1 in the output-matching circuit) and sub-line CSL1 in the coupler are formed in a multilayer substrate such as a ceramic laminate. FIG. 17 shows sixth to eighth layers among all 16 layers constituting the high-frequency device. As in the example shown in FIG. 1, all layers are divided to two regions, electrode patterns constituting the high-frequency amplifier HPA being disposed in a left-side region, and electrode patterns constituting the antenna switch module ASM being disposed in a right-side region. In FIG. 17, other portions constituting the output-matching circuit and the coupler are omitted.

As shown in FIG. 17, electrode patterns 105-108 for the output-matching circuit containing the first transmission line and electrode patterns 109 and 110 for the sub-line CSL1 are formed on dielectric layers, and the main line and the sub-line are opposing via a dielectric layer. The electrode patterns 105, 106 are part of the first transmission line in the output-matching circuit on the lower frequency side. The electrode pattern 105 acting as the main line ASL1 of the coupler is opposing the electrode pattern 109 for the sub-line CSL1. The electrode patterns 107, 108 are part of the first transmission line in the output-matching circuit on the higher frequency side. The electrode pattern 107 acting as the main line of the coupler is opposing an electrode pattern 110 for the sub-line. Because the main line and the sub-line are disposed via a dielectric layer, there is no likelihood of short-circuiting even if their gap is narrowed.

Figure 18:
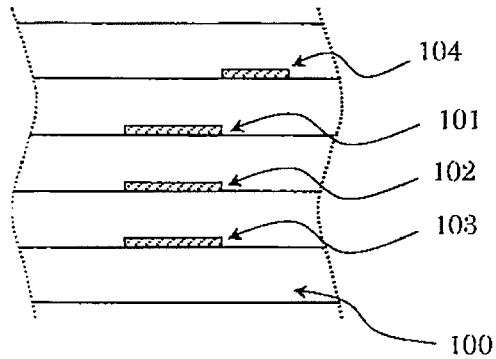
FIG. 18 is a partial cross-sectional view showing one example of the positional relations between the first transmission line in the output-matching circuit and the sub-line of the coupler, in part of the high-frequency device according to the second embodiment of the present invention.

FIG. 18 shows one example of the relation between electrode patterns for the first transmission line and an electrode pattern for the sub-line. Electrode patterns 101, 102, 103 for the first transmission line are formed on different dielectric layers 100, and an electrode pattern 104 for the sub-line is formed on a dielectric layer different from those of the electrode patterns 101, 102, 103.

Figure 19:
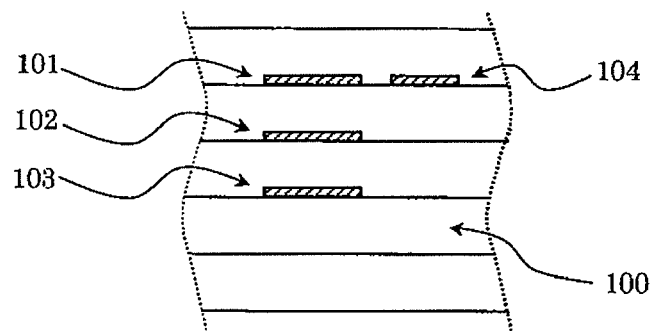
FIG. 19 is a partial cross-sectional view showing another example of the positional relations between the first transmission line in the output-matching circuit and the sub-line of the coupler, in part of the high-frequency device according to the second embodiment of the present invention.

FIG. 19 shows another example of the relation between electrode patterns for the first transmission line and an electrode pattern for the sub-line. Among pluralities of dielectric layers on which electrode patterns 101, 102, 103 for the first transmission line are formed, an electrode pattern 104 for the sub-line is formed on a dielectric layer, on which the electrode pattern 101 is formed. Namely, an electrode pattern for the transmission line portion acting as the main line and an electrode pattern for the sub-line are opposing on a dielectric layer. In this case, too, there may be insulating ceramic between both lines. The gap between both opposing lines is preferably constant.

Figure 20:
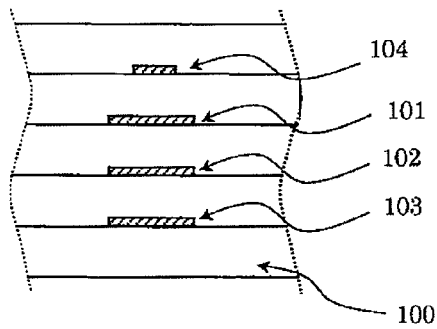
FIG. 20 is a partial cross-sectional view showing a still further example of the positional relations between the first transmission line in the output-matching circuit and the sub-line of the coupler, in part of the high-frequency device according to the second embodiment of the present invention.

FIG. 20 shows an example, in which an electrode pattern 101 for the first transmission line acting as the main line and an electrode pattern for the sub-line 104 are opposing via a dielectric layer. The degree of coupling between a main line and a sub-line is determined by their gap, which is determined by the thickness of the dielectric layer. A dielectric ceramic layer is preferable because its thickness can be controlled with high precision.

In the example shown in FIG. 20, the electrode pattern for the sub-line 104 is narrower than the electrode pattern 101 for the first transmission line acting as the main line, and when viewed from above, the electrode pattern 104 is disposed inside the width of the electrode pattern 101 (does not extend outside from the electrode pattern 101). This structure ensures the gap between the electrode patterns 101 and 104 to be unchanged even with positional deviation to some extent, thereby suppressing the change of their coupling.

Figure 21:
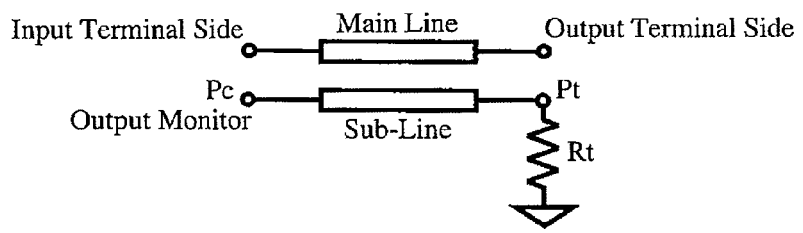
FIG. 21 is a view showing one example of the terminal structures of the coupler in the high-frequency device according to the second embodiment of the present invention.
Figure 22A:
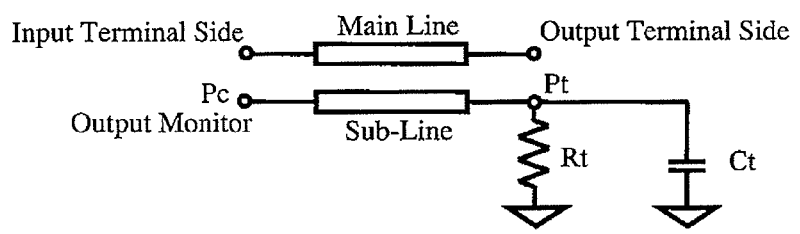
FIG. 22(a) is a view showing another example of the terminal structures of the coupler in the high-frequency device according to the second embodiment of the present invention.
Figure 22B:
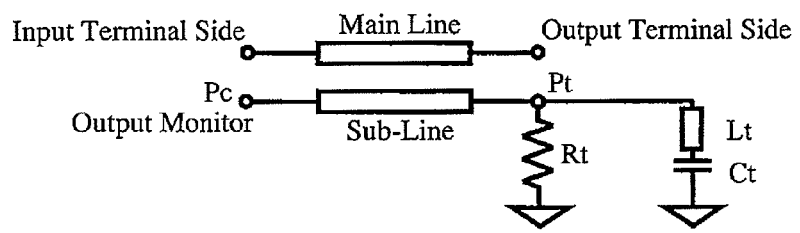
FIG. 22(b) is a view showing a further example of the terminal structures of the coupler in the high-frequency device according to the second embodiment of the present invention.

As shown in FIG. 21, the second end Pt (on the opposite side of an output monitor) of the sub-line of coupler is grounded via a resistor Rt. As shown in FIG. 22(a), the resistor Rt may be connected in parallel to a capacitor Ct, whose other end is grounded. With one end of the sub-line terminated with parallel-connected resistor and capacitor, a main line and a sub-line can be shortened, advantageous for miniaturization. Also, because an isolation peak and capacitance can easily be controlled simply by adjusting the line length. Further, because it provides the degree of coupling with a flat gradient, wide band is achieved. As shown in FIG. 22(b), the resistor Rt may be connected in parallel to an LC series resonance circuit of a capacitor Ct and a transmission line Lt, whose end is grounded. This structure further shortens the sub-line. The capacitor Ct can be made smaller by the existence of the transmission line Lt, advantageously for miniaturization with remarkable effects of adjusting an isolation peak and providing a wider band. The terminal structure of the sub-line of the coupler shown in FIGS. 21 and 22 may be used regardless of whether or not the output-matching circuit is integral with the coupler.

The formation of the capacitor Ct by electrode patterns in the multilayer substrate is advantageous for miniaturization. Alternatively, when the capacitor Ct is a part mounted on a multilayer substrate, adjusting can be made on every product, reducing the ratio of defective products. The same is true of the transmission line Lt.

(B) High-Frequency Device (Composite Laminate Module)

The high-frequency device according to the second embodiment comprises an output-matching circuit and an antenna switch module with impedance matching, and a coupler as part of the output-matching circuit. Because matching is needed only between the output-matching circuit and the antenna switch module, the high-frequency device can be miniaturized with lower loss than when the coupler is disposed between the output-matching circuit and the antenna switch module. In such connection matching, VSWR (voltage standing wave ratio) may be 1.5 or less, preferably 1.2 or less. Because other portions than the coupler are the same as in the first embodiment shown in FIG. 9, their explanation will be omitted.

The laminate obtained as in the first embodiment has a size of about 5.8 mm× about 5.8 mm× about 0.45 mm, having diodes, transistors, chip inductors and chip capacitors on an upper surface of the laminate. A final product with a metal case is as high as about 1.25 mm, and a resin-sealed product is as high as about 1.2 mm.

Figure 23A:
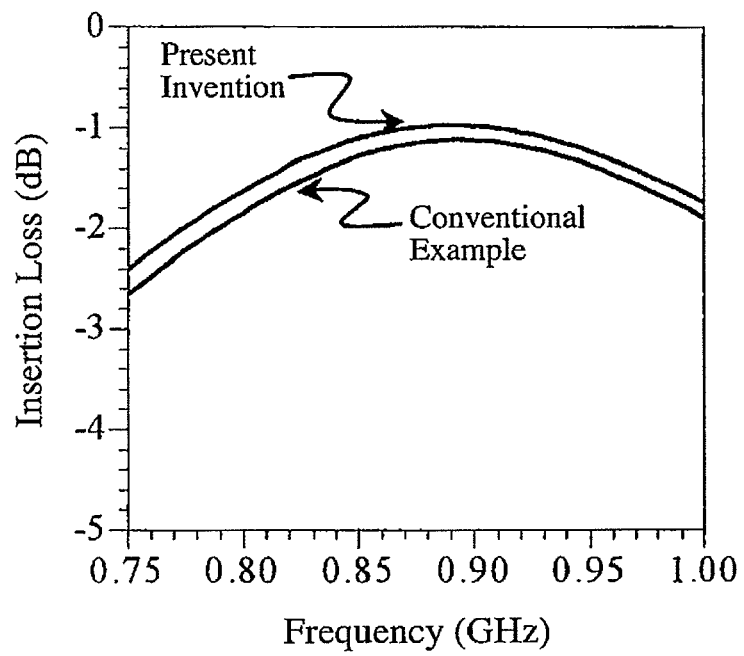
FIG. 23(a) is a graph showing the comparison of insertion loss characteristics between the high-frequency device according to the second embodiment of the present invention, and a conventional example in which a power amplifier including an output-matching circuit and a coupler are discretely mounted on a printed circuit board.

With respect to insertion loss, the high-frequency device in this embodiment, in which the output-matching circuit and the coupler have impedance matching of less than 50Ω, is improved by about 0.15-0.25 dB, on both lower frequency side (GSM, EGSM) and higher frequency side (DCS, PCS), than a conventional example, in which a power amplifier including an output-matching circuit and a coupler are discretely mounted on a printed circuit board. This improvement is about 2-3%, when converted to the efficiency of the power amplifier. FIG. 23(a) shows the improvement of insertion loss on the lower frequency side in 750 MHz to 1 GHz. The improvement of insertion loss is similarly obtained on the higher frequency side.

Figure 23B:
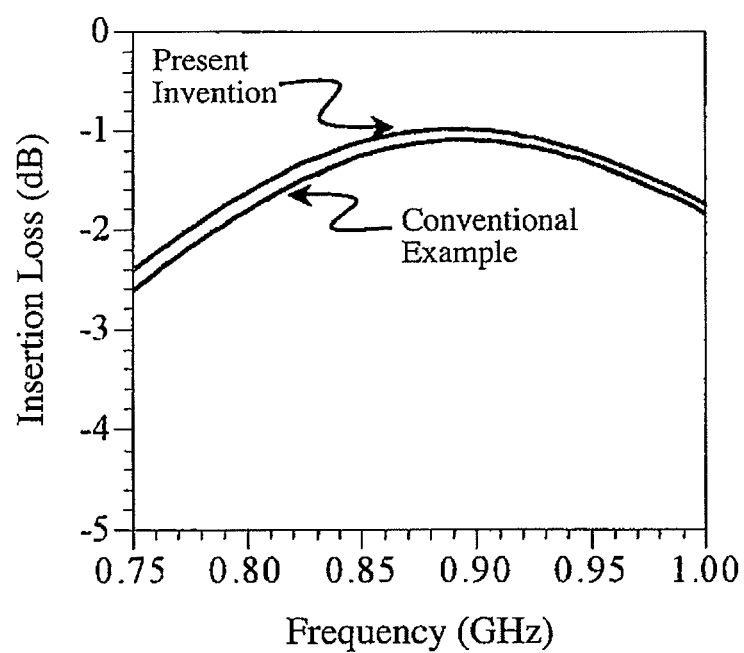
FIG. 23(b) is a graph showing the comparison of insertion loss characteristics between the high-frequency device according to the second embodiment of the present invention, and a conventional high-frequency device in which an output-matching circuit and a coupler are combined with matching of 50Ω.

The above high-frequency device of the present invention was compared with a high-frequency device in which an output-matching circuit is combined with a coupler with matching of 50Ω. As large improvement of insertion loss as about 0.1-0.15 dB was obtained on both lower frequency side (GSM, EGSM) and higher frequency side (DCS, PCS). FIG. 23(b) shows the improvement of insertion loss on the lower frequency side in 750 MHz to 1 GHz. This improvement is about 1-2%, when converted to the efficiency of the power amplifier. The improvement of insertion loss is similarly obtained on the higher frequency side. In view of the fact that the efficiency of a power amplifier has substantially reached the limit, its improvement as large as 1% or more is a remarkable effect.

Figure 24:
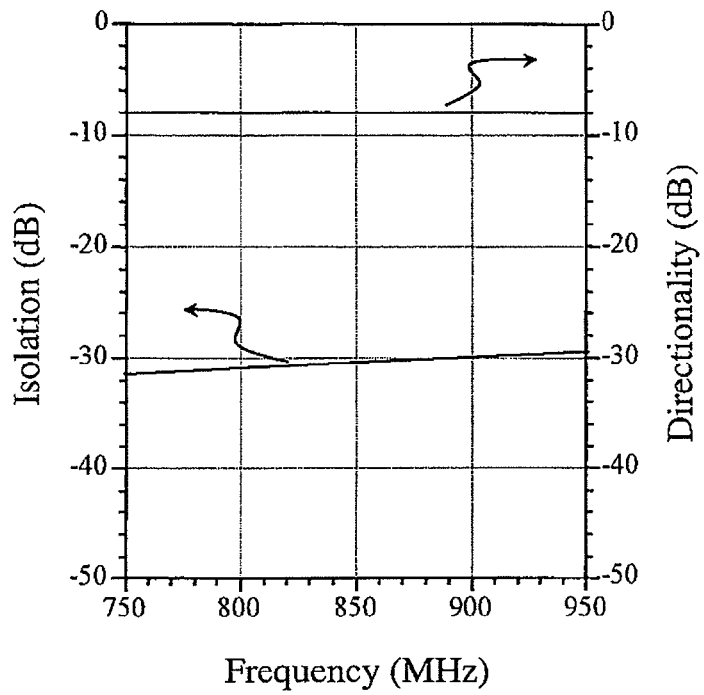
FIG. 24 is a graph showing the isolation and directionality of the coupler shown in FIG. 21.
Figure 25:
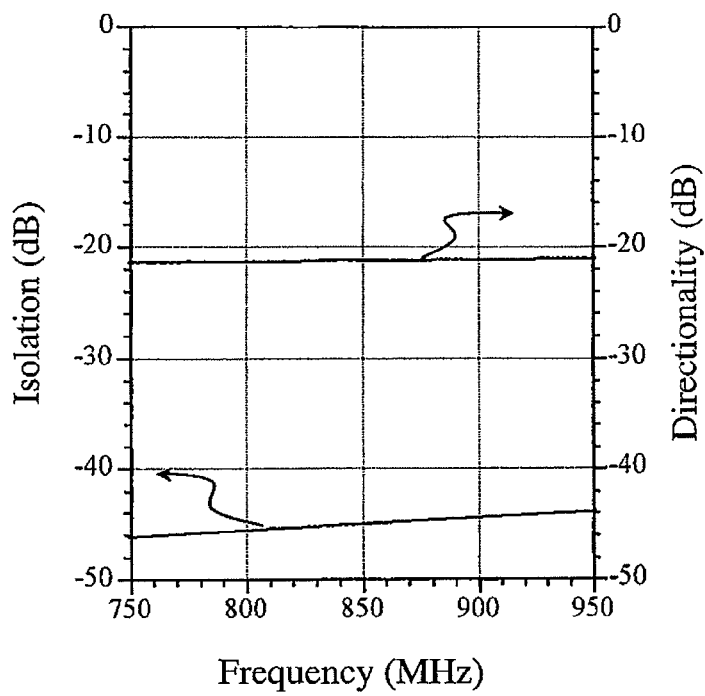
FIG. 25 is a graph showing the isolation and directionality of the coupler shown in FIG. 22(a).
Figure 26:
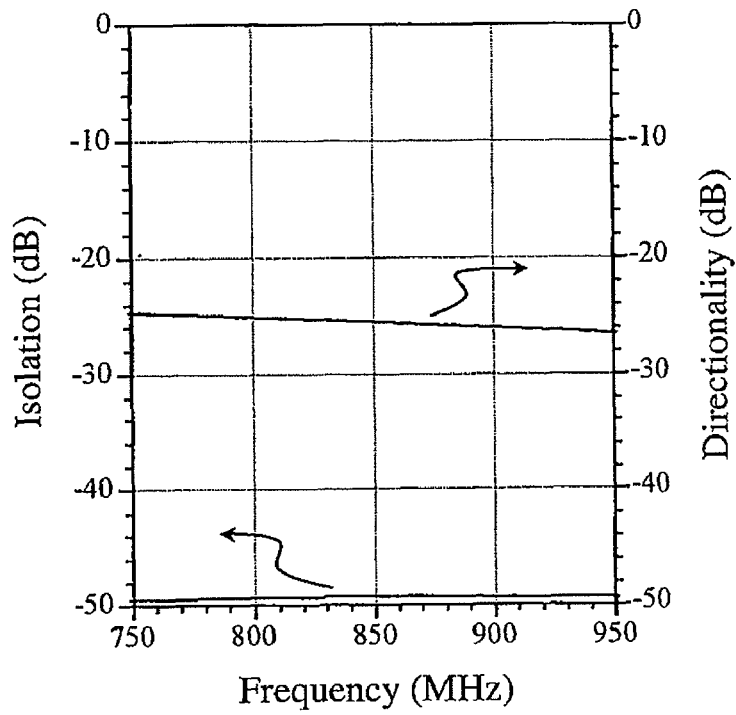
FIG. 26 is a graph showing the isolation and directionality of the coupler shown in FIG. 22(b).

When the coupler terminated only with a resistor Rt as shown in FIG. 21 was designed to have insertion loss of 0.1 dB and the degree of coupling of −20 dB, the directionality was −8 dB, and the isolation was about −30 dB, as shown in FIG. 24. In an example terminated with a capacitor without changing insertion loss and the degree of coupling [FIG. 22(a)], both directionality and isolation were drastically improved by 12 dB or more as shown in FIG. 25. In an example terminated with a capacitor and a transmission line [FIG. 22(b)], the directionality was improved by 16 dB or more, and the isolation was improved by 17 dB or more as shown in FIG. 26.

With respect to the size, a conventional coupler discretely mounted needed a volume of about 1 mm$^3$ and a mounting area of about 2-4 mm$^2$. In a case where a coupler and an output-matching circuit were simply integrated, too, the high-frequency device was larger by about 1 mm$^3$ per each frequency band (about 2 mm$^3$ in two bands). In this embodiment, however, the volume is as small as about 0.4 mm$^3$ in the case of termination with a capacitance, and about 0.5 mm$^3$ or less in the case of termination with a capacitance and a transmission line, integration can be achieved without changing the size of the high-frequency device. In this case, the sub-line was as long as about 2 mm on the lower frequency side, and about 1 mm on the higher frequency side, both 3 mm or less.

[3] Third Embodiment

Figure 27:
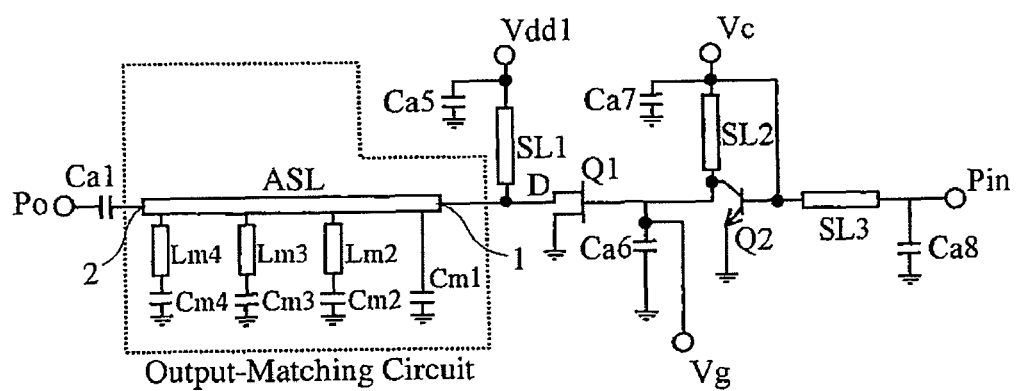
FIG. 27 is a view showing one example of the equivalent circuits of the high-frequency circuit according to the third embodiment of the present invention.

FIG. 27 shows one example of the high-frequency devices according to the third embodiment of the present invention, which comprises a resonance circuit branch-connected to the first transmission line. With respect to the same structure and function as in the first and second embodiments, explanation will be omitted. Of course, the structure of the high-frequency device in the third embodiment is not limited to those depicted, but may be applied widely to high-frequency devices comprising a high-frequency amplifier and an output-matching circuit.

(A) Output-Matching Circuit

While pluralities of capacitors Cm1, Cm2, Cm3, Cm4 each having one end grounded are branch-connected to the transmission line ASL in the output-matching circuit in the first embodiment shown in FIG. 1, resonance circuits are branch-connected to the first transmission line in the third embodiment. The resonance circuit may be an LC resonance circuit, a stub, etc. The LC resonance circuit may be, for instance, a series resonance circuit comprising a second transmission line branch-connected to the first transmission line ASL and a first capacitor having one end connected to the second transmission line and the other end grounded, or a parallel resonance circuit comprising a third transmission line series-connected to the first transmission line ASL and a second capacitor parallel-connected to the third transmission line.

In the example shown in FIG. 27, pluralities of first capacitors Cm1, Cm2, Cm3, Cm4 grounded are branch-connected to the first transmission line ASL, and the second transmission lines Lm2, Lm3, Lm4 are connected in series respectively between the first capacitors Cm2, Cm3, Cm4 and the first transmission line ASL. The output-matching circuit shown in FIG. 27 has impedance necessary for output matching, and functions described below, by a combination of the second transmission line and the first capacitor. Each combination of the second transmission line Lm2 and the first capacitor Cm2, the second transmission line Lm3 and the first capacitor Cm3, and the second transmission line Lm4 and the first capacitor Cm4 constitutes a series resonance circuit. For instance, when the resonance frequency of at least one of series resonance circuits is adjusted such that the attenuation pole of the output-matching circuit is substantially equal to at least one of n-th harmonics (n is a natural number of 2 or more) such as a 2f wave, a 3f wave, etc. of the high-frequency power (frequency: f), the n-th harmonics can be drastically attenuated. The number of series resonance circuits each comprising a first capacitor and a second transmission line, which are branch-connected to the first transmission line ASL, may be determined depending on the number of bands to be attenuated.

In addition, impedance matching may be controlled by changing the constants of the second transmission line and the first capacitor, the adjustment of the connection points of the series resonance circuits to the first transmission line ASL, etc. The constants of the second transmission line and the first capacitor can be changed, while keeping constant the resonance frequency of the series resonance circuit expressed by $1/[2\pi(LC)^{1/2}]$. With such improvement of the degree of freedom of design, the first transmission line ASL can be made shorter to reduce transmission loss while keeping the desired impedance matching and attenuation characteristics.

Figure 28:
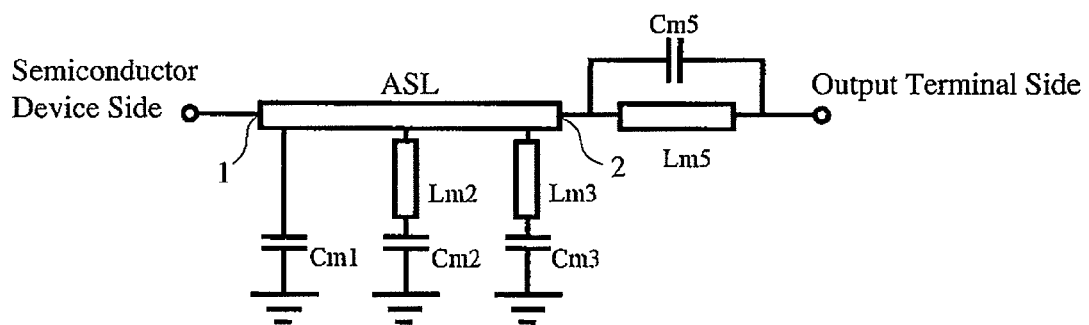
FIG. 28 is a view showing another example of output-matching circuits used in the high-frequency circuit according to the third embodiment of the present invention.

FIG. 28 shows another example of the output-matching circuits according to the third embodiment. This output-matching circuit comprises three capacitors Cm1, Cm2 and Cm3 each having one end branch-connected to the first transmission line ASL and the other end grounded, second transmission lines Lm2 and Lm3 each series-connected between the capacitor Cm2, Cm3 and the first transmission line ASL, a third transmission line Lm5 series-connected to the first transmission line ASL, and a second capacitor Cm5 parallel-connected to the third transmission line Lm5. The third transmission line Lm5 and the second capacitor Cm5 constitute a parallel resonance circuit, whose resonance frequency can be made equal to the frequency of an unnecessary band to attenuate the unnecessary band. This structure can materialize a parallel resonance circuit without a grounded electrode, attenuating harmonics. In the case of FIG. 28, too, the number of series resonance circuits each comprising the first capacitor and the second transmission line may be determined depending on the number of bands to be attenuated, etc. For instance, when the series resonance circuit is in a 2f band while the parallel resonance circuit is in a 3f band, relatively large second and third harmonics among those in the power can be effectively attenuated with a small, three-dimensional mounting structure. Although the parallel resonance circuit is disposed on the side of the second end 2 in FIG. 28, it may be disposed on the side of the first end 1 or between the series resonance circuits.

In the structure of FIG. 27 in which series resonance circuits are connected to the first transmission line ASL, and the structure of FIG. 28 in which series resonance circuits and a parallel resonance circuit are connected to the first transmission line ASL, a resonance circuit for second harmonics is disposed preferably on the semiconductor device side, to achieve both reduction of insertion loss and increase in attenuation in unnecessary bands. Also, the frequencies of harmonics to be attenuated preferably become higher in the order of a 2f band, a 3f band and a 4f band from the semiconductor device side. For wider-band operation, an element connected to the first transmission line ASL on the semiconductor device side may be only a capacitor.

Figure 29:
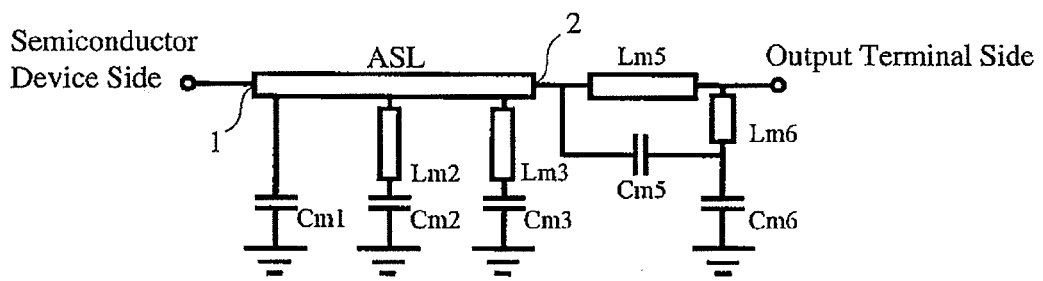
FIG. 29 is a view showing a further example of output-matching circuits used in the high-frequency circuit according to the third embodiment of the present invention.

FIG. 29 shows a further example of the output-matching circuits in the third embodiment. This output-matching circuit comprises a fourth transmission line Lm6 having one end connected to the output-terminal-side end of the third transmission line Lm5 and the other end connected to the output-terminal-side end of the second capacitor Cm5 in the parallel resonance circuit in the output-matching circuit shown in FIG. 28, and a third capacitor Cm6 having one end connected to the other end of the fourth transmission line Lm6 and the other end grounded. Because the transmission lines Lm5, Lm6 and the capacitors Cm5, Cm6 constitute substantially the same structure as a lowpass filter with attenuation poles, the structure of FIG. 29 has more attenuation than the parallel resonance circuit (Lm5, Cm5) of FIG. 28, resulting in a wider attenuated band. Further, the structure of FIG. 29 easily achieves the adjustment of both attenuation poles and impedance matching. Although the resonance circuit (Lm5, Lm6, Cm5, Cm6) is disposed on the side of the second end 2 in FIG. 29, it may be disposed on the side of the first end 1 or between the series resonance circuits. To achieve both reduction of insertion loss and increase in attenuation in unnecessary bands, for instance, a series resonance circuit (Lm2, Cm2) having an attenuation pole in a 3f band, a resonance circuit (Lm5, Lm6, Cm5, Cm6) having an attenuation pole in a 2f band, and a series resonance circuit (Lm3, Cm3) having an attenuation pole in a 4f band may be connected in this order from the semiconductor device side.

(B) High-Frequency Device (Composite Laminate Module)

The high-frequency device in this embodiment has essentially the same structure as in the first embodiment, except for having a series resonance circuit comprising Lm2, Cm2, etc. (FIG. 27), a parallel resonance circuit comprising Lm5 and Cm5 (FIG. 28), or a resonance circuit comprising Lm5, Lm6, Cm5 and Cm6 (FIG. 29). Though not explicitly depicted in FIGS. 27-29, part of the first transmission line may be used as a main line, and combined with a sub-line in parallel to constitute a coupler. Dielectric layers and conductor patterns constituting the high-frequency device may be the same as in the first and second embodiments. Further, when the first transmission line is constituted by pluralities of conductor patterns series-connected in the multilayer substrate, and when a resonance circuit is connected to at least one of pluralities of conductor patterns, the high-performance high-frequency device can be further miniaturized.

The laminate obtained as in the first and second embodiments has a size of about 5.8 mm× about 5.8 mm× about 0.45 mm, and diodes, transistors, chip inductors and chip capacitors are mounted on an upper surface of the laminate, and covered with a metal case or a resin-sealing package to provide a final product. The metal-case-covered product is as high as about 1.25 mm, and the resin-sealed product is as high as about 1.2 mm.

The present invention will be explained in further detail referring to Examples blow, without intention of restricting the scope of the present invention thereto.

Examples 1-3, and Reference Example 1

High-frequency devices (Examples 1-3) each comprising an output-matching circuit comprising the resonance circuit shown in FIGS. 27-29, and a high-frequency device (Reference Example 1) comprising an output-matching circuit without a resonance circuit were compared with respect to high-frequency characteristics (insertion loss and attenuation of harmonics) on the lower frequency side, the total length of electrode patterns necessary for forming a transmission line for the output-matching circuit, and the total capacitance of both of electrode patterns and mounted parts. The results are shown in Table 1.

TABLE 1

| No. | Resonance Circuit | Insertion Loss (dB) | Attenuation (dB) | | |
|---|---|---|---|---|---|
| | | | Second Harmonics | Third Harmonics | Fourth Harmonics |
| Reference Example 1 | No | 2.2-2.4 | 8-11 | 11-15 | 16-19 |
| Example 1 | FIG. 27 | 2.0-2.2 | 16-20 | 24-26 | 25-28 |
| Example 2 | FIG. 28 | 2.0-2.2 | 18-23 | 24-26 | 29-33 |
| Example 3 | FIG. 29 | 2.0-2.2 | 18-23 | 24-26 | 29-33 |

| No. | Total Length of Electrode Patterns* (mm) | Total Capacitance (pF) |
|---|---|---|
| Reference Example 1 | 23 | 38 |
| Example 1 | 18 | 30 |
| Example 2 | 17 | 24 |
| Example 3 | 16 | 24 |

Note:
*The total length of electrode patterns necessary for forming a transmission line for the output-matching circuit.

Examples 1-3 with the resonance circuit were not poorer than Reference Example 1 having no resonance circuit in insertion loss, drastically improved than Reference Example 1 in the attenuation of second to fourth harmonics, and smaller than Reference Example 1 in both of the total length of electrode patterns and the total capacitance, indicating that their high-frequency devices were miniaturized. It is thus clear that the use of an output-matching circuit comprising a resonance circuit provides small high-frequency devices having excellent high-frequency characteristics. Though the above comparison was conducted on the output-matching circuit on the lower frequency side, the same results are obtained on the output-matching circuit on the higher frequency side.

From the aspect of impedance design, the distance between the transmission line and the ground electrode is important, resulting in larger design limitation in electrode patterns for the transmission line than electrode patterns for the capacitors. Accordingly, priority is placed more on the design of electrode patterns for the transmission line than that for the capacitors. Further, because the structure of the first transmission line in the output-matching circuit has large influence on insertion loss, both Examples and Reference Example used the first transmission line having the same structure, particularly the distance between the electrode patterns for the first transmission line and the ground electrode, which was an important design parameter, being about 75 μm. The larger distance between the electrode patterns for the first transmission line and the ground electrode makes the first transmission line shorter, thereby reducing insertion loss. For instance, when the above distance is increased to 100 μm or more by making the dielectric layer thicker, the high-frequency characteristics are further improved.

Examples 4 and 5, and Reference Example 1

As a result of comparison between high-frequency devices (Examples 4 and 5) in which the coupler shown in FIG. 16 was added to the output-matching circuit shown in FIGS. 1 and 27, respectively, and the high-frequency device of Reference Example 1, it was found that the insertion loss of the output-matching circuit in Examples 4 and 5 was smaller by about 0.1-0.25 dB than that of Reference Example 1 on both lower frequency side (GSM, EGSM) and higher frequency side (DCS, PCS). This improvement is about 1-3%, when converted to the efficiency of the power amplifier, an important characteristic. In view of the fact that the efficiency of the power amplifier substantially reached the limit, efficiency improvement of 1% or more obtained by using part of the output-matching circuit for a coupler is a remarkable effect of the present invention.

With respect to the characteristics of the coupler, the capacitance-terminated output-matching circuit (Example 4) was drastically improved over that of Reference Example 1, 12 dB or more in directionality, and 12 dB or more in isolation. Further improvement over Reference Example 1 was obtained by the output-matching circuit terminated with a capacitance and a transmission line (Example 5), 16 dB or more in directionality and 17 dB or more in isolation.

With respect to the mounting volume, both of the capacitance-terminated output-matching circuit (Example 4) and the output-matching circuit terminated with a capacitance and a transmission line (Example 5) were about 0.4 mm³, less than 0.5 mm³. The sub-line length was about 2 mm on the lower frequency side, and about 1 mm on the higher frequency side, both less than 3 mm. It is thus clear that the structure of the present invention, in which part of the first transmission line is used as a main line for the coupler, can drastically miniaturize the high-frequency device.

Effect of the Invention

Because at least part of the first transmission line is constituted by pluralities of conductor patterns formed on pluralities of dielectric layers, which are series-connected to in a lamination direction, the high-frequency device of the present invention can be miniaturized with a smaller conductor pattern on each dielectric layer. By spirally connecting pluralities of conductor patterns with a lamination direction as a center axis, high impedance is obtained even in a limited space, resulting in further miniaturization of the high-frequency device. With the impedance of the first transmission line increasing from the input end to the output end, impedance matching from the high-frequency amplifier to the output terminal can be easily achieved.

What is claimed is:

1. A high-frequency device having a high-frequency circuit comprising a high-frequency amplifier, and an output-matching circuit receiving high-frequency power output from said high-frequency amplifier, formed in and on a multilayer substrate obtained by laminating pluralities of dielectric layers, said output-matching circuit comprising:
   a first transmission line which transmits said high-frequency power from the high-frequency amplifier side to the output terminal side; and
   at least one resonance circuit branch-connected from said first transmission line to ground,
   wherein at least a part of said first transmission line is formed by conductor patterns formed on at least three adjacent dielectric layers in said multilayer substrate.

2. The high-frequency device according to claim 1, wherein pluralities of said conductor patterns are spirally connected with a lamination direction as a center axis.

3. The high-frequency device according to claim 2, wherein pluralities of said conductor patterns are connected through via-electrodes, and wherein among pluralities of said conductor patterns, those formed on adjacent dielectric layers are opposing in a lamination direction only in portions connected through said via-electrode.

4. The high-frequency device according to claim 1, wherein a portion of said first transmission line, which is constituted by pluralities of conductor patterns formed on pluralities of dielectric layers, has a first end on the high-frequency amplifier side and a second end on the output terminal side, said first end being connected to said high-frequency amplifier through a via-electrode, and said second end being located at a lamination direction position closer to or more distant from said high-frequency amplifier than said first end.

5. The high-frequency device according to claim 4, wherein a ground electrode is disposed at a lamination direction position closer to the first end than the second end of said first transmission line, or at a lamination direction position closer to the second end than the first end of said first transmission line.

6. The high-frequency device according to claim 5, wherein in at least part of adjacent dielectric layers, a conductor pattern formed on a dielectric layer closer to said ground electrode is wider than a conductor pattern formed on a dielectric layer more distant from said ground electrode.

7. A high-frequency device having a high-frequency circuit comprising a high-frequency amplifier, and an output-matching circuit receiving high-frequency power output from said high-frequency amplifier, in and on a multilayer substrate obtained by laminating pluralities of dielectric layers, said output-matching circuit comprising:
   a first transmission line which transmits said high-frequency power from the high-frequency amplifier side to the output terminal side; and
   at least one resonance circuit branch-connected to said first transmission line,
   wherein at least a part of said first transmission line being constituted by conductor patterns formed on dielectric layers in said multilayer substrate, and
   said resonance circuit is a series resonance circuit constituted by a first capacitor and a second transmission line.

8. The high-frequency device according to claim 7, wherein the resonance frequency of said resonance circuit is adjusted such that it is substantially equal to at least one frequency of the n-th harmonics of said high-frequency power, wherein n is a natural number of 2 or more.

9. The high-frequency device according to claim 7, which comprises a parallel resonance circuit constituted by a third transmission line series-connected to said first transmission line, and a second capacitor parallel-connected to said third transmission line.

10. The high-frequency device according to claim 9, which further comprises a fourth transmission line and a third capacitor, one end of said fourth transmission line being connected to an output-terminal-side end of said third transmission line, the other end of said fourth transmission line being connected to an output-terminal-side end of said second capacitor, one end of said third capacitor being connected to the other end of said fourth transmission line, and the other end of said third capacitor being grounded.

* * * * *